July 15, 1958 J. B. ARMITAGE ET AL 2,843,024
DUAL TRANSMISSION AND CONTROL MECHANISM
Filed June 14, 1954 7 Sheets-Sheet 1

INVENTORS.
JOSEPH B. ARMITAGE, THEODORE A. WETZEL,
GERHARD G. BAUMBACH, FRANK ZANKL.
BY Elroy J Wutschel
Attorney INVENTORS.
JOSEPH B. ARMITAGE, THEODORE A. WETZEL,
GERHARD G. BAUMBACH, FRANK ZANKL.
BY Elroy J Wutschel
Attorney

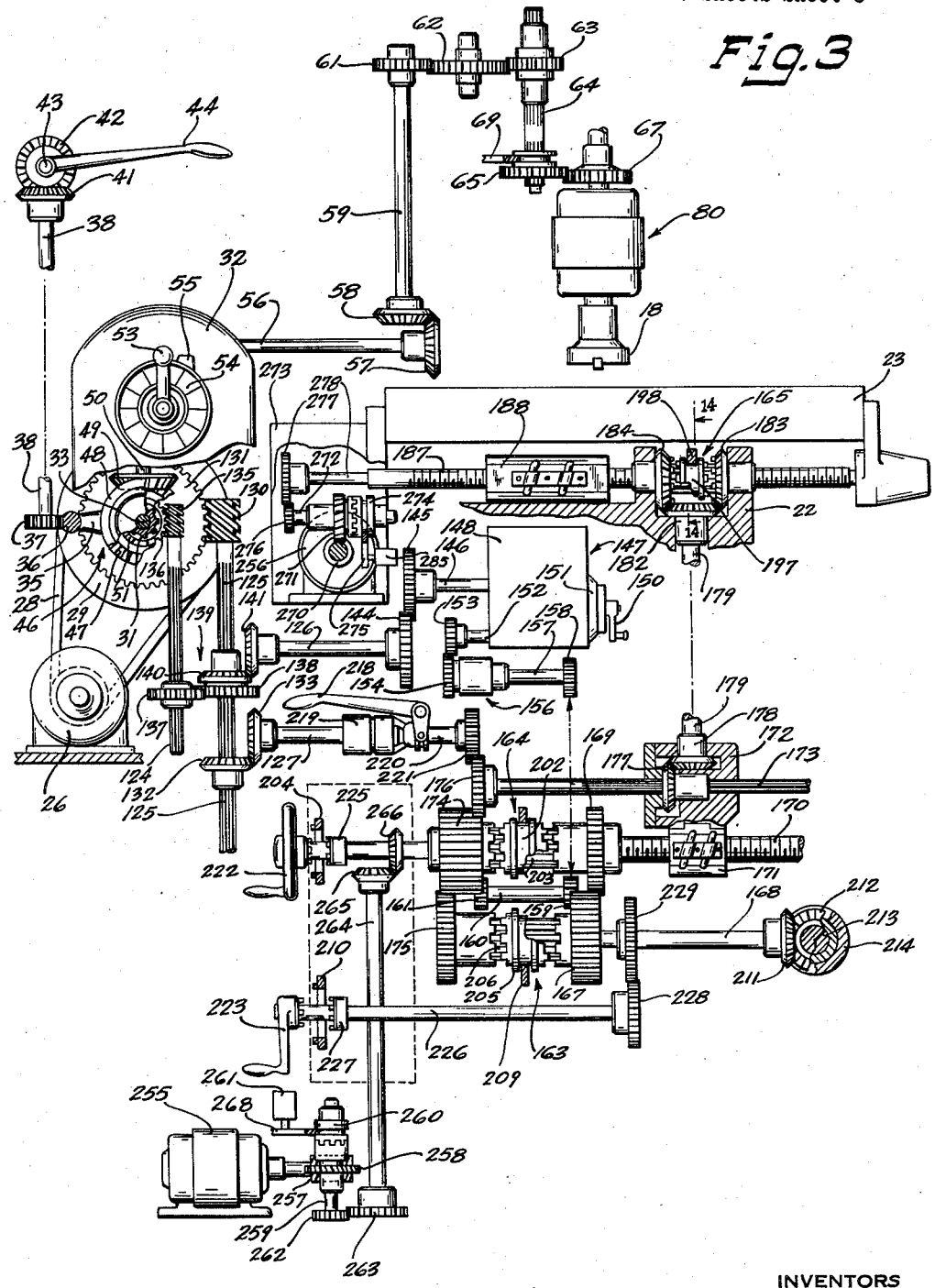

July 15, 1958   J. B. ARMITAGE ET AL   2,843,024
DUAL TRANSMISSION AND CONTROL MECHANISM
Filed June 14, 1954   7 Sheets-Sheet 4
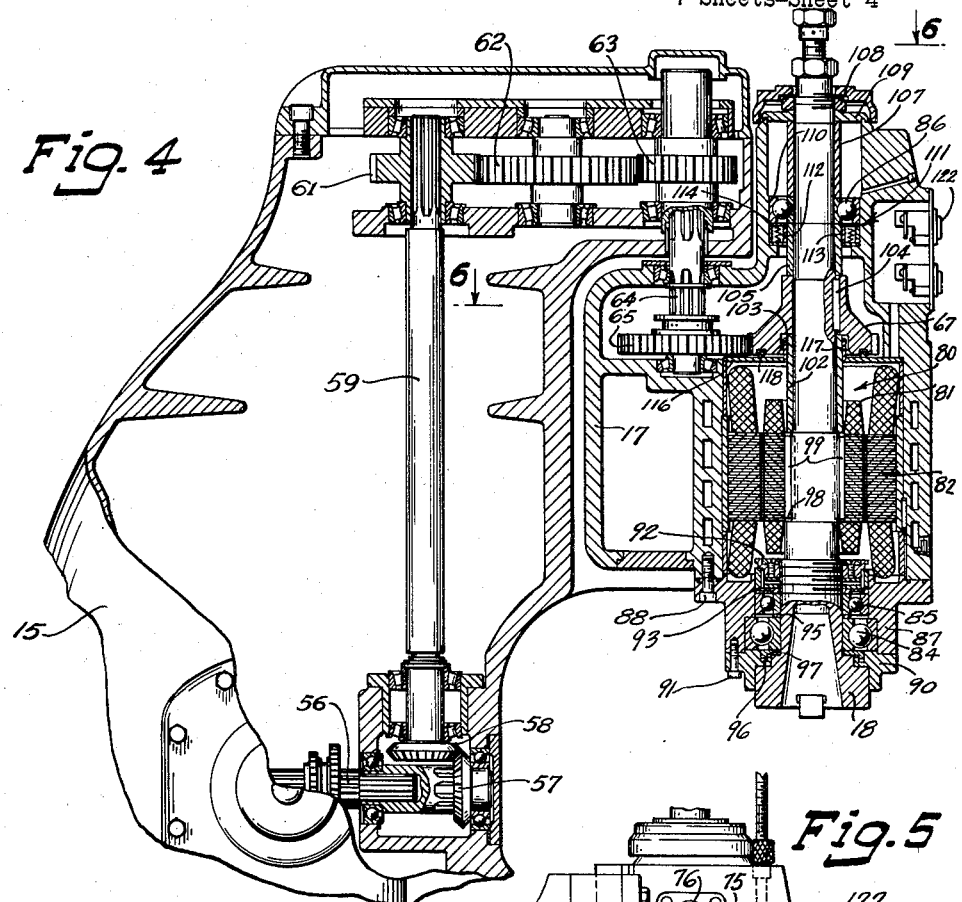
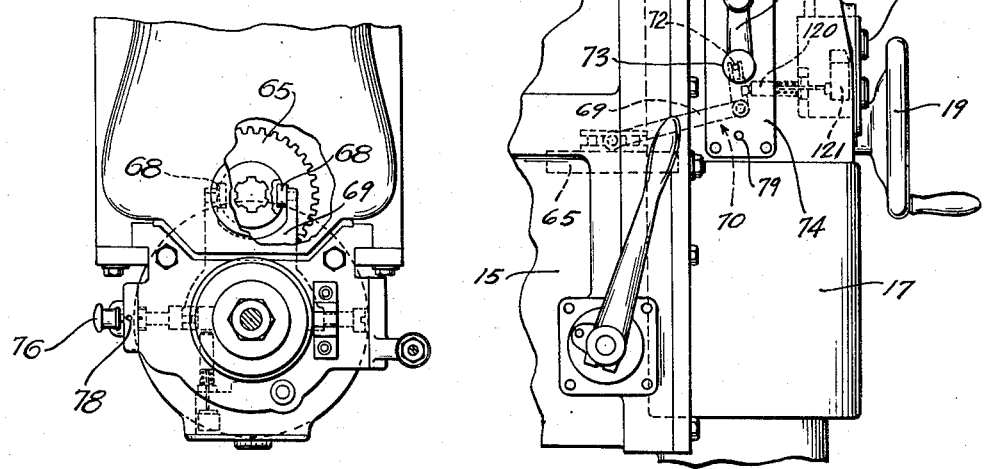
INVENTORS
JOSEPH B. ARMITAGE, THEODORE A. WETZEL,
GERHARD G. BAUMBACH, FRANK ZANKL.
BY *Elmy J Wutschel*
Attorney July 15, 1958 J. B. ARMITAGE ET AL 2,843,024
DUAL TRANSMISSION AND CONTROL MECHANISM
Filed June 14, 1954 7 Sheets-Sheet 5

INVENTORS
JOSEPH B. ARMITAGE, THEODORE A. WETZEL,
GERHARD G. BAUMBACH, FRANK ZANKL.
BY Elroy J Wutschel
Attorney

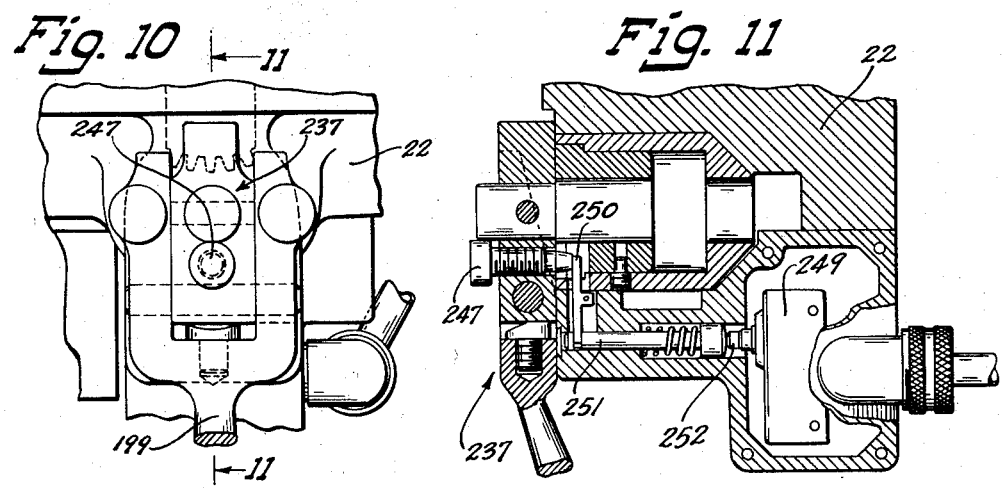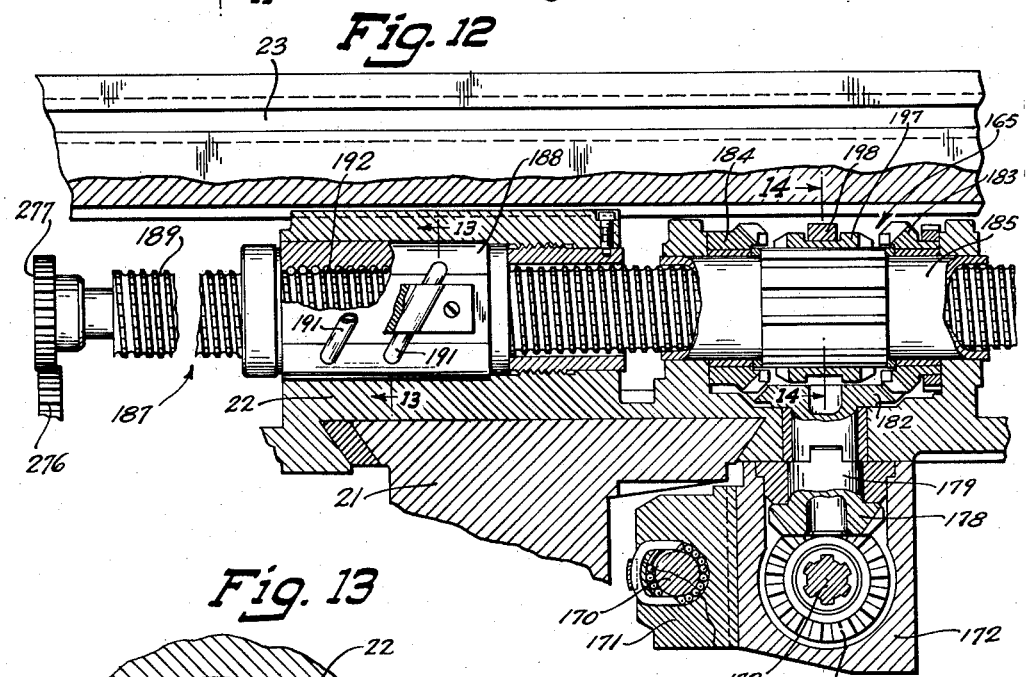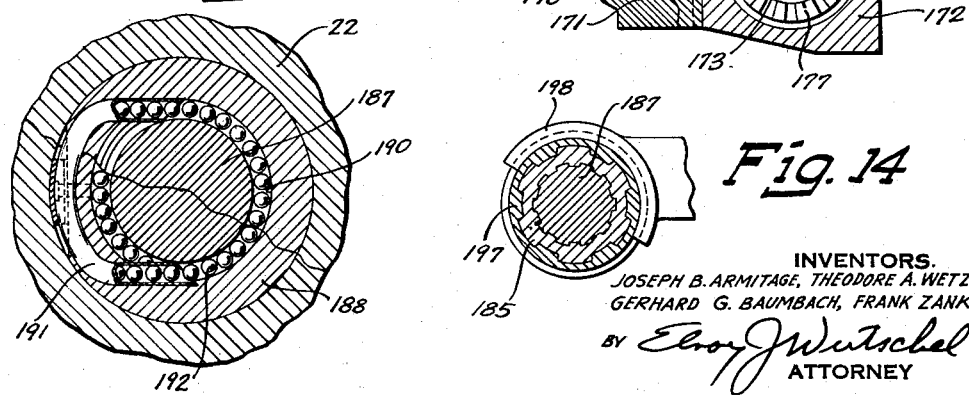

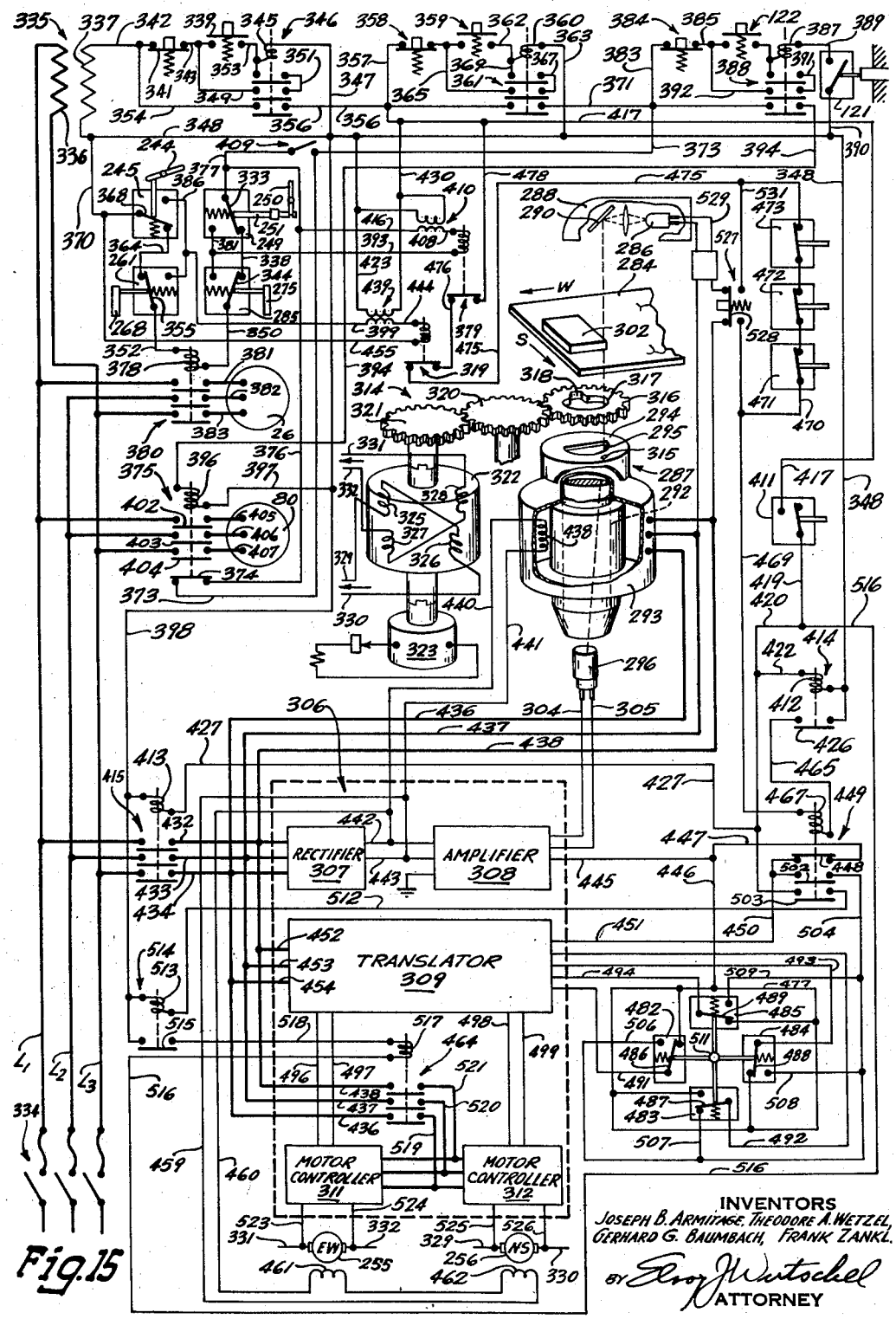

United States Patent Office 2,843,024
Patented July 15, 1958

2,843,024

DUAL TRANSMISSION AND CONTROL MECHANISM

Joseph B. Armitage, Wauwatosa, Theodore A. Wetzel, Brookfield, and Gerhard G. Baumbach and Frank Zankl, Milwaukee, Wis., assignors to Kearney & Trecker Corporation, West Allis, Wis., a corporation of Wisconsin Application June 14, 1954, Serial No. 436,358

13 Claims. (Cl. 90—13.5)

This invention relates generally to milling machines and more particularly to an improved dual transmission and control mechanism arranged to control feeding movements of a milling machine for performing conventional milling operations as well as automatically controlled copying operations.

A general object of this invention is to provide an improved milling machine adapted to perform conventional plain milling operations as well as automatically controlled copying operations with equal facility.

Another object of this invention is to provide an improved milling machine having selective manual and power operable directional control of three movable work supporting elements for conventional milling operations, as well as an automatic line tracker control system connectable to coordinately control two of the work supporting elements for performing two dimensional copying operations.

Another object of the invention is to provide an improved driving arrangement for the screw and nut translating mechanisms of a milling machine.

Another object of the invention is to provide an improved milling machine provided with two separate power sources selectively connectable to drive the tool spindle thereof throughout an extremely wide range of output speeds.

Another object of the invention is to provide an improved simplified controlling mechanism adapted to selectively and coordinately control a machine tool for performing either conventional plain milling operations or automatically controlled copying operations.

Another object of the invention is to provide in a milling machine an improved transmission means for driving a screw and nut translating mechanism at a selected uniform conventional feed driving rate or at an automatically variable copying rate.

Another object is to provide two feed driving trains adapted to be selectively connectable for driving the screw and nut translating mechanisms of a milling machine.

Another object of the invention is to provide improved means for journalling a machine tool spindle to rotate throughout an extremely wide range of output speeds.

Another object is to provide an improved geared driving train in combination with a direct motor drive adapted to be selectively connected to drive the tool spindle of a milling machine throughout an extremely wide range of output speeds.

Another object is to provide an improved control circuit adapted to coordinately and selectively control a plurality of driving motors for a machine tool.

Another object is to provide an improved transmission mechanism selectively operable to drive the work support of a machine tool at a uniform conventional feeding rate, at a fast rapid traverse rate and at an automatically varying copying rate of travel.

Another object is to provide an improved simplified transmission mechanism and control mechanism adapted to simplify and facilitate the performance of plain conventional milling operations and two dimensional copying operations.

Another object is to provide an improved milling machine that is adapted to be selectively operated as a conventional milling machine or as a copying machine, as well as a combination machine, i. e. partly as a conventional machine during certain copying operations.

According to this invention, a milling machine of the vertical spindle type is provided with an improved integrated transmission and control mechanism that is selectively operable to effect feeding movement of the work supports for performing plain conventional milling operations, or, alternatively for performing automatically controlled copying operations. In either selected mode of operation, the vertical tool spindle is connected to be driven at a selected speed in a relatively low range by a variable speed transmission, or at an extremely high operating speed by a separate high speed motor. Power for driving the transmission mechanism is derived from one or another of several driving motors including a main drive motor in the base, a pair of copy feed motors respectively carried by two of the work supporting members, and the high speed spindle driving motor which is energizable to drive the tool spindle at high rates of speed. To perform conventional milling operations, the main drive motor is selectively energizable and connectable to drive the various work supporting members including the knee, saddle and table at rapid traverse rate or at a selected work feeding rate. To transmit power from the main drive motor, there are provided a plurality of reversible disconnect clutches that are selectively engageable from a central neutral position for transmitting power to drive the knee, saddle and table respectively. The main drive motor is likewise connectable to drive the speed transmission for rotating the tool spindle at a selected speed in a low range irrespective of whether the machine is being operated as a conventional milling machine or as a two dimensional copying machine. Whenever, the speed transmission is disconnected to interrupt the transmission of power from the main drive motor to the spindle, an interlocking switch is actuated to permit energization of the high speed motor for driving the tool spindle at an extremely high rate of speed. The high speed motor is energizable to drive the tool spindle during either a conventional milling operation or a copying operation. As a prerequisite to performing a copying operation, locking means are provided to clamp the directional clutches respectively associated with the saddle and table into a central neutral position to interrupt the transmission of power thereto from the main drive motor. Protective electrical interlocking means are provided to preclude the performing of copying operations whenever the machine is to be used for conventional milling operations. Conversely, the interlocking means function to prevent copying operations when the machine is operated for conventional milling operations. With the machine arranged for copying operation, a two-dimensional pattern of predetermined configuration may then be utilized to so activate the copy control circuit as to effect a coordinated energization of the copy feed motors to move the saddle and table for generating a workpiece corresponding in configuration to the guiding pattern.

The invention is exemplified herein by embodiments illustrated in connection with a general representation of a typical machine tool structure. It is to be understood, however, that the particular embodiments shown are intended to be illustrative only and that various other structural forms within the range of equivalents of the features defined in the subjoined claims, may be utilized in practicing this invention in connection with any of various other machine tools or similar apparatus.

The foregoing and other objects of this invention, which will become more fully apparent from the following detailed description, may be achieved by the particular apparatus that is depicted in and described in connection with the following drawings, in which:

Fig. 3 is a diagrammatic view of the transmission and control mechanism;

Fig. 4 is an enlarged fragmentary view in transverse vertical section through the upper portion of the machine, including the spindle head and taken generally along the lines 4—4 in Fig. 1;

Fig. 5 is a fragmentary view in left side elevation of the upper portion of the machine showing the electrical interlock for the spindle motor;

Fig. 6 is a view in horizontal transverse section through the upper portion of the machine and taken along the line 6—6 in Fig. 4;

Fig. 10 is an enlarged top plan view of the table directional lever;

Fig. 11 is an enlarged detailed view in transverse vertical section through the knee directional lever and interlocking mechanism, taken generally along the line 11—11 in Fig. 10;

Fig. 12 is a view in longitudinal vertical section through the table driving mechanism, showing the recirculating ball type nut and screw actuating mechanism, and taken generally along the lines 12—12 in Fig. 2;

Fig. 13 is an enlarged view in vertical section through the table feed screw and nut, showing the recirculating ball type construction, and taken along the line 13—13 in Fig. 12;

Fig. 14 is an enlarged detailed view in transverse vertical section through the feed driving mechanism for rotating the recirculating ball type table screw and taken along the lines 14—14 in Figs. 3 and 12;

Fig. 15 is a schematic circuit diagram of the main actuating control circuit and showing a fragmentary perspective view of the copy control mechanism connected to actuate the automatically operative copy control portion of the main circuit; and, Fig. 16 is a fragmentary schematic circuit diagram showing a modification of a portion of the actuating control circuit illustrated in Fig. 15.

The particular machine tool shown in the accompanying drawings as exemplifying a preferred embodiment of the present invention is a vertical spindle milling machine of the knee and column type. It will be understood, however, that any modifications may be made in the specific structural details thereof within the scope of the appended claims without departing from the spirit of the invention.

Figure 1:
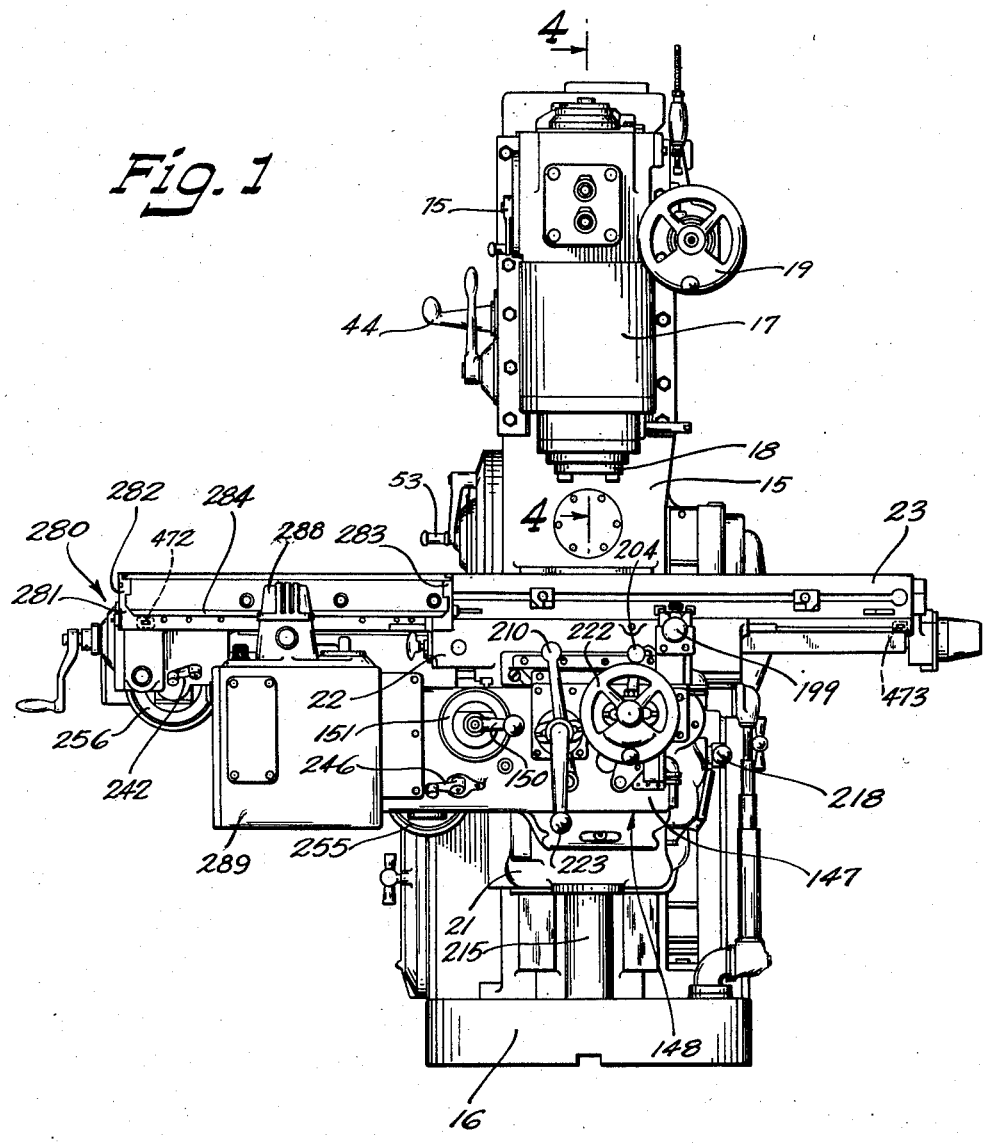
Figure 1 is a view in front elevation of a vertical spindle milling machine exemplifying a machine tool in which the features of the present invention may be incorporated to advantage.
Figure 2:
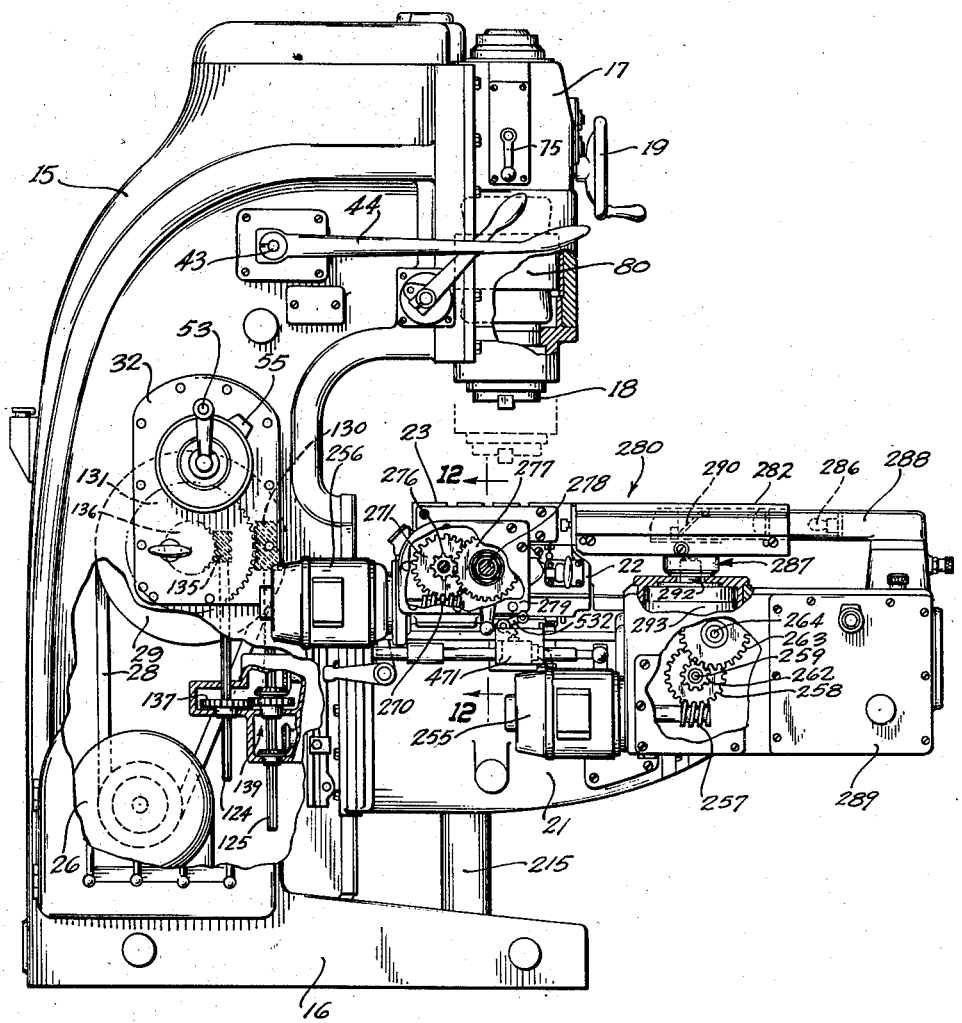
Fig. 2 is a view of the machine principally in left side elevation and with parts of the machine broken away to show some of the internal operating mechanism.

Referring more specifically to the drawings, and particularly to Figs. 1 and 2 thereof, the machine tool there shown as comprising a preferred embodiment of this invention is a knee type milling machine of the vertical spindle type having as its principal supporting frame a vertically upstanding column 15 formed integrally with a forwardly extending base 16. At its upper forward portion, the column 15 is disposed to slidably support a spindle carrying head 17 for selective vertical adjustment. A depending vertical tool or cutter spindle 18 is rotatably journalled in the spindle head 17 for selective vertical adjustment therewith. To effect vertical adjustment of the spindle head 17, there is provided a rotatable handwheel 19 journalled in the column 15 and connected in well known manner to actuate a screw and nut actuating mechanism (not shown).

Beneath the vertical tool spindle 18, the column 15 is adapted to movably support a plurality of slidably superimposed work supporting members including a knee 21, a saddle 22 and a work table 23. The knee 21 is slidably carried on the front face of the column 15 for selective vertical movement therealong and, in turn, is arranged to slidably support on its upper surface the saddle 22 which is mounted for slidable transverse movement toward or away from the front face of the column 15. The work table 23 is slidably carried on the top surface of the saddle 22 for longitudinal movement in a plane transverse to the plane in which the saddle is movable.

The machine shown in Figs. 1 and 2 as constituting a preferred embodiment of the invention is adapted to be operated as a conventional milling machine as well as an automatically controllable copying machine for reproducing workpieces corresponding to suitable patterns of predetermined configuration. To this end, there is provided improved controlling and transmission apparatus arranged to simplify and facilitate the selection of a particular mode of operation, as well as to provide improved operational efficiency irrespective of the selected mode of operation. The entire transmission and control system constitutes a unitary operating mechanism coordinated in a manner to permit utilization of either the conventional milling machine drive, the copy control drive or a combination of both of these drives for certain milling operations. To simplify the description, however, the machine will first be described as a conventional milling machine.

Power for driving the various movable elements of the machine including the knee 21, the saddle 22, and the work table 23, as well as for rotating the tool spindle 18 is derived from a main drive motor 26 carried within the hollow lower portion of the column 15 as shown in Figs. 2 and 3. From the main drive motor 26, power transmitted by means of multiple V-belts 28 to rotate a main drive pulley 29 journalled within the central portion of the hollow column 15 on the rearwardly extending end of a hollow main transmission shaft 31 journalled in a speed changing transmission mechanism 32.

For selectively coupling the main drive pulley 29 into driving engagement with the hollow transmission shaft 31, there is provided a clutch mechanism (not shown) at the rearward end of the shaft 31 and that is connected to be selectively engaged by longitudinal axial movement of a shifter rod 33 slidably carried within the hollow shaft 31. The shifter rod 33 is connected to be moved by a shifter fork 35 secured to a horizontally movable rack 36, slidably carried in the column 15 for longitudinal movement. The rack 36 is provided with rack teeth having meshing engagement with the complementary gear teeth of a rotatable pinion 37 secured to the lower end of an upwardly extending vertical control shaft 38 rotatably journalled in the column 15. At its upper end, the rotatable control shaft 38 carries a bevel gear 41 that is disposed to be engaged by a complementary bevel gear 42 secured to the inner end of a horizontal stub shaft 43 rotatably journalled in a side wall of the column 15 as shown in Figs. 2 and 3. A pivotally movable clutch control lever 44 is secured to the outer end of the stub shaft 43 for rotating the pinion 37 to effect axial shifting movement of the shifter rod 33 and thus coupling the main drive pulley 29 into driving engagement with the hollow transmission shaft 31.

From the hollow main transmission shaft 31 power is transmitted to a reversing mechanism 46 constituted by a pair of rotatable bevel gears 47 and 48 journalled on the shaft 31 and having meshing engagement with a complementary driven bevel gear 49 secured to the lower end of a rotatable input shaft 50. Adjacent their inwardly extending hubs, the bevel gears 47 and 48 are provided with circumferentially speced clutch teeth (not shown) respectively disposed to have meshing engagement with complementary clutch teeth formed on the opposite ends of an axially shiftable clutch collar 51 that is movably carried therebetween in slidably splined engagement with the transmission shaft 31. By means of this arrangement, the clutch collar 51 is movable into clutching engagement with one or the other of the bevel gears 47 or 48 to transmit power for rotating the driven bevel gear 49 and input shaft 50 in a selected direction of rotation.

The input shaft 50 is journalled to rotate in the speed changing mechanism 32 which is preferably of the shiftable geared type providing fixed steps of output driving power. To selectively adjust the output speed rate of the spindle speed transmission 32, a speed selecting crank 53 journalled for rotation in the outer wall thereof is connected to selectively actuate a speed selecting mechanism (not shown). For determining the selected rate of speed, the crank 53 is likewise connected to effect positioning movement of a concentrically rotatable speed selecting dial 54 bearing appropriate indicia adapted to be read against a stationary indicator mark 55.

From the speed transmission mechanism, power is transmitted to rotate a horizontal output shaft 56 journalled to rotate within the upper central portion of the hollow column 15, as shown in Figs. 3 and 4. From the shaft 56 power is transmitted through a bevel gear 57 secured thereto and thence to a complementary bevel gear 58 secured to a vertical shaft 59 journalled to rotate in the upper forward portion of the column 15 in parallelism with the vertical tool spindle 18. A spur gear 61 splined to the upper end of the vertical shaft 59 is disposed to meshingly engage an idler gear 62 which in turn transmits power to rotate a complementary spur gear 63 journalled to rotate in the extreme upper forward portion of the column 15 and in overlying relationship with a rearwardly extending portion of the spindle head 17. The spur gear 63, journalled in the column 15, is provided with internal splines disposed to slidably engage the splined upper end of a vertical input shaft 64 journalled at its lower end to rotate within the rearwardly extending portion of the spindle head 17. Thus, by means of the slidable splined connection between the gear 63 and the vertical shaft 64, spindle driving power may be transmitted from the column 15 to the spindle head 17 in any selected position of vertical adjustment of the spindle head within its allowable range of adjustment relative to the supporting column 15.

For transmitting power from the shaft 64 to drive the vertical tool spindle 18, a shiftable gear 65 is slidably splined to the lower end of the shaft 64 for selective shiftable movement into meshing engagement with a complementary spindle drive gear 67 keyed to the central portion of the tool spindle 18. With the shiftable gear 65 in meshing engagement with the spindle driving gear 67 as shown in Figs. 3 and 4, and the clutch control lever 44 in engaged position for coupling the main drive motor 26 to drive the hollow transmission shaft 31, power is transmitted from the main drive motor 26 to rotate the tool spindle 18 at a selected speed determined by the adjustment of the variable speed transmission mechanism 32.

To effect selective shiftable movement of the gear 65 along the vertical shaft 64, as shown in Figs. 4, 5 and 6, a pair of shoes 68 carried at the extreme outer ends of a forked arm 69 of a pivotal bell crank 70 are disposed to engage an annular groove formed in an enlarged hub of the gear 65. The bell crank 70 is pivotally mounted within the hollow spindle head 17 and is provided with an angularly diverging opposite arm that is slotted toward its outer end to slidably receive an eccentric actuating pin 72 fixedly secured to the inner end of a stub shaft 73. The stub shaft 73 is rotatably journalled in a bracket 74 secured to an outer side wall of the spindle head 17 and has secured to its outer end the hub of a pivotally movable shifter crank 75. The shifter crank 75 is provided with a resiliently returnable latching knob 76 adapted to selectively withdraw a latching pin 78 for engagement with an upper latching notch formed in the bracket 74 or with a lower notch 79 formed therein. With the shifter crank 75 positioned, as shown in Fig. 6, in a manner that the latching pin 78 engages the upper notch, the bell crank 70 is so positioned as to retain the shiftable gear 65 in meshing engagement with the spindle driving gear 67. As the shifting crank 75 is moved downwardly to its opposite position, the eccentrically positioned pin 72 secured to the stub shaft 73 is caused to slidably engage the slot formed in the crank arm to pivot the bell crank 70 and thus urge the shiftable gear 65 upwardly and out of engagement with the spindle driving gear 67. With the shifter crank moved to its extreme opposite position in a manner that the latching pin 78 engages the lower notch 79 the shiftable gear 65 will be retained in an upward disengaged position for interrupting the transmission of power to the spindle drive gear 67.

The spindle driving train hereinbefore described including the main drive motor 26 and the variable speed transmission 32, is operable to supply power for driving the tool spindle 18 at a selected speed in a relatively low range of driving speeds that is not only adequate, but necessary for many machining operations. With the advent of newer milling cutters and improved metal cutting techniques, however, certain machining operations, particularly those involving non-ferrous materials, require extremely high spindle and cutter speeds. To this end, the tool spindle is adapted to be driven alternatively by a high speed motor 80 mounted within the spindle head 17 and that is connected to be selectively energizable whenever the slidable gear 65 is shifted upwardly into disengaged power interrupting position relative to the spindle drive gear 67.

The high speed motor 80 comprises a rotor 81 keyed directly to the central portion of the tool spindle 18 immediately below the spindle driving gear 67 and adapted to rotate within a cooperating stator 82 secured within the spindle head 17. It is contemplated that the motor 80 be energizable to rotate the tool spindle at a selected high operating speed, for example, 3600 R. P. M. and 7200 R. P. M., through the use of a frequency converter. However, it is to be understood that any other suitable independent motor may be utilized to drive the tool spindle, whether it be energizable to operate at a single output speed or at a plurality of different speeds. The principal requirement is that the motor connected to independently drive the tool spindle 18 be operable at speeds different than the speeds obtainable from the variable speed transmission mechanism 32. With the combination of the independent spindle motor 80 and the spindle driving train including the variable speed transmission 32, the utmost flexibility in selecting the most appropriate cutting speed for the widest possible variety of machining operations is provided. With the transmission adjusted to the lowest output speed, for example, the tool spindle may be operated to rotate a large diameter cutter for certain machining operations. With the high speed motor connected to drive the spindle at 7200 R. P. M. on the other hand, the spindle may be operated to rotate a very small diameter cutter with equal facility and efficiency of operation. Likewise, the tool spindle may be connected to be driven at a required speed intermediate the lowest speed available from the variable speed transmission 32 and the speeds from the motor 80.

In order that the tool spindle 18 may be rotated throughout such an extremely wide range of operating speeds, the spindle is journalled at its lower end in bearings 84 and 85, as shown in Fig. 4, that are arranged to restrain it against vertical axial movement in either direction, irrespective of the selected operating speed. Toward its upper end, the spindle 18 is rotatably journalled in a bearing 86, the outer race of which is resiliently biased for a limited axial movement to compensate for temperature changes that occur as the spindle is adjusted to rotate at the highest speeds. This arrangement obviates binding and overloading of the bearings with the attendant overheating and possibility of bearing failure.

To accomplish this, the outer race of the lower spindle bearing 84 is fixedly retained within a circular recess formed in a bearing housing 87 that is secured to the underside of the hollow spindle head 17 by means of cap screws 88. A flanged bearing retainer 90 is in turn secured to the underside of the housing 84 by means of cap screws 91 and with its inner flanged shoulder in abutting engagement with the outer race of the lower bearing 84 to restrain the bearing against axial movement in either direction. The spindle 18 is fixedly secured to the inner races of the lower bearings 85 and 84 by means of an adjustable spindle nut 92 threaded on the lower portion of the spindle 18 into abutting engagement with a circular grease retainer 93 that encircles the spindle immediately above the bearing 85. A shoulder on the grease retainer is clamped against the inner race of the bearing 85, the outer race of which is received within a circular bore formed in the bearing housing 87. At its opposite side the inner race of the bearing 85 is clamped against a thrust washer 95 that abuts the inner race of the lower bearing 84 and that in turn is clamped against a circular flanged lower grease retainer 96 abutting a flanged peripheral shoulder 97 formed toward the lower end of the spindle 18.

The bearing housing 87 defines the lower end of a circular compartment formed within the lower central portion of the spindle head 17 for receiving the independent motor 80, the stator 82 for which is fixedly secured within the spindle head 17 concentrically with the tool spindle 18. The cooperating rotor 81 for the motor 80 is keyed by means of keys 99 to a portion of the tool spindle 18 of reduced diameter, immediately above a flanged peripheral shoulder 98 formed thereon. The lower end of the rotor 81 is maintained in abutting engagement with the spindle shoulder 98 by a spacer sleeve 102 encircling the spindle 18 and engaging the upper end of the rotor. The sleeve 102 extends upwardly out of the motor compartment in a manner that its opposite end is maintained in engagement with a recessed shoulder 103 formed on the underside of the spindle drive gear 67. The spindle drive gear 67 is secured to the spindle 18 by a key 104 and is provided with an upwardly extending hub that is maintained in abutting engagement with the lower end of a middle spacer sleeve 105 encircling the spindle 18. At its upper end, the sleeve 105 engages the inner race of the upper spindle bearing 86 which is retained in fixed relationship along the spindle 18 by clamping engagement against an upper spacer sleeve 107. To retain the elements encircling the spindle 18 in endwise clamping engagement, a spindle clamp nut 108 threaded to the upper end of the spindle 18 is disposed to urge an upper circular member 109 downwardly into clamping engagement with the upper end of the upper spindle spacer sleeve 107.

To permit a limited axial movement of the upper spindle bearing 86, the outer race thereof is slidably carried within a circular bored opening 110 formed in the upper portion of the spindle head 17. A resilient bearing retainer 111 seated against an inwardly extending circumferential flange formed at the lower end of the opening 110 is disposed to urge the outer race of the bearing 86 upwardly. The resilient bearing retainer or mount 111 comprises essentially a plurality of circumferentially spaced compression springs 112 seated at their lower ends within a spring retainer member 113 encircling the middle spindle sleeve 105. The upper ends of the springs 112 are disposed to exert a balanced upward resilient force against a thrust washer 114 that abuts the underside of the outer race of the spindle bearing 86. Upwardly urged movement of the outer race of the bearing 86 is limited because the inner race thereof is retained in axially fixed relationship to the spindle 18 by means of the clamping engagement between the middle and upper bearing sleeves 105 and 107 respectively. However, the entire bearing 86 is free to move axially in either direction as the tool spindle 18 is caused to contract or expand longitudinally as a result of the changing operating temperatures caused by operating the tool spindle at different selected speeds throughout its allowable range. At the same time, the lower tool carrying end of the spindle 18 is continuously maintained in fixed axial relationship to the spindle head 17 by the lower bearings 84 and 85 to insure accuracy of a cutting operation at any operating speed and irrespective of the axial movement of the upper bearing 86.

To protect the motor 80 against the admission of lubricant, a circular shield 116 having a central circular opening for receiving the tool spindle 18 is tightly fitted in the upper end of the circular motor recess formed within the lower central portion of the hollow spindle head 17. Within the central circular opening formed in the shield 116 is fitted an upwardly extending sleeve extension 117 of the shield disposed to encircle the spindle and extend upwardly within the circular recess formed in the underside of the spindle driving gear 67.

As a further deterrent to the admission of lubricant into the motor compartment, the circular shield 116 is provided with an upwardly extending circular flange 118 extending upwardly into a complementary circular groove formed in the bottom face of the spindle drive gear 67. Thus, the shield 116, together with the upwardly extending sleeve extension 117 and extension flange 118, is adapted to retain lubricant within the hollow central portion of the spindle head 17 that constitutes a gear compartment for the shiftable gear 65 and the spindle driving gear 67. Likewise, the shield 116 cooperates with the enlarged circular recess formed toward the lower portion of the spindle head 17 to constitute a protective enclosure for the motor 80.

As a prerequisite to energizing the high speed motor 80 for driving the tool spindle 18 at extremely high speeds, it is necessary to pivot the shifter crank 75 to its downward position and thus effect an upward shiftable movement of the gear 65 into disengaged position relative to the spindle driving gear 67. Simultaneously with the shifting movement of the gear 65, the downward pivotal movement of the shifter crank 75, causes the upper slotted arm of the bell crank 70 to move rightwardly to actuate a switch actuating plunger 120 slidably carried in the spindle head 17 as shown in Fig. 5. Rightward movement of the horizontally slidable plunger 120 operates to depress an actuating button of a normally open switch 121 that is operatively connected in a low voltage control circuit for the motor 80 as will hereinafter be more fully explained. Whenever the switch 121 is actuated to a closed position by rightward movement of the actuating plunger 120, the motor 80 is selectively energizable to drive the tool spindle 18 at high speed by depressing a motor start button switch 122 at the front upper portion of the spindle head 17. Conversely, since the plunger 120 is normally resiliently biased in a leftward direction, upward pivotal movement of the shifter crank 75 to its engaged position shown in Fig. 6 permits leftward movement of the plunger 120 to actuate the switch 121 to its normally open position and thus interrupting the low voltage control circuit for the motor 80. By means of this arrangement, the shifter crank 75 together with the actuating plunger 120 and the normally open switch 121 operate as an interlock to preclude energization of the high speed motor 80 whenever the shiftable gear 65 is in engagement with the spindle gear 67 to transmit power from the main drive motor in the base for driving the tool spindle 18.

Power for driving the slidable work supporting members including the knee 21, the saddle 22 and the table 23 at a selected work feeding rate as well as at a rapid traverse rate is likewise derived from the main drive motor 26 in the base as shown in Figs. 2 and 3. From the column 15, power is transmitted by means of a pair of downwardly extending splined shafts 124 and 125 that are operatively connected to transmit driving power to respectively rotate a pair of horizontal shafts 126 and 127 journalled in the rightward side of the knee 21. The horizontal driven shafts 126 and 127 are in turn respectively connectable to effect independent selective movement of the slidable work supporting members at a selected feeding rate or at a rapid traverse rate.

The rightward vertical splined shaft 125 is journalled at its upper end to rotate in the rightward side of the column 15 and has secured thereto a worm 130 having meshing engagement with a wormwheel 131 connected to be driven directly by the main drive pulley 29 whenever the main drive motor 26 in the column is energized. Toward its lower end, the downwardly depending splined shaft 125 has sildable splined engagement with a bevel gear 132 journalled toward the right rearward extending portion of the knee 21. The bevel gear 132 is disposed to meshingly engage a complementary bevel gear 133 journalled in the knee and that is secured to one end of the horizontal input shaft 127 journalled therein. By means of this arrangement, the horizontal shaft 127 is rotated to constitute a source of live rapid traverse driving power whenever the main drive motor 26 in the base is energized to rotate.

In a similar manner, the splined shaft 124 is journalled at its upper end in the rightward portion of the column 15 and has secured to its upper end a worm 135 having meshing engagement with a wormwheel 136 that is connected to be driven by the hollow main transmission drive shaft 31 journalled in the variable speed transmission 32. Thus, with the main drive motor 26 energized to rotate, the wormwheel 135 is rotated to drive the splined shaft 124 whenever the starting lever 44 at the side of the column 15 is actuated to move the shifter rod for actuating the clutch mechanism (not shown) to couple the main drive pulley 29 to the hollow drive shaft 31. A spur gear 137 journalled in the knee 21 is slidably splined to the lower end of the vertical driving shaft 124 and is disposed to be in meshing engagement with an idler pinion 138 constituting a part of an idler cluster gear 139 journalled in the knee 21 in concentric relationship with the rapid transverse shaft 125. The idler cluster 139 is provided with an enlarged bore disposed to encircle the rapid traverse splined shaft 125 with no operative connection therebetween in a manner that the shaft and gear are independently rotatable at different rates of speed. Integrally formed with the idler cluster gear 139 is a bevel gear 140 having meshing engagement with a bevel gear 141 secured to the horizontal input shaft 126 journalled to rotate in the rightward side of the knee 21. The vertical splined shaft 124 together with the gears 137, 139, 141 and the horizontal shaft 126 constitute a portion of the feed driving train for transmitting feed driving power from the column to the knee from whence it is distributed to effect independent selective movement of the slidably superimposed work supporting members 21, 22 and 23. The horizontal feed driving input shaft 126 in the knee is connected to be rotated whenever the starting lever 44 is engaged to couple the main drive pulley 29 to the hollow transmission shaft 31 to supply driving power to the variable speed spindle driving train in the column 15.

From the feed driving input shaft 126, the flow of power continues through a spur gear 144 secured thereto and having meshing engagement with a complementary spur gear 145 secured to a rotatable shaft 146 journalled to rotate in an adjustable feed rate changing transmission mechanism 147. The feed rate changing transmission 147 is preferably of the fixed step variable speed type and is contained within a housing 148 that is, in turn, removably secured within a hollow recess formed in the central portion of the knee 21. As shown in Figs. 1 and 3, there is provided at the front of the knee 21 a rotatably journalled feed rate selecting crank 150 adapted to be read in conjunction with indicia on a feed change dial 151 and being operatively connected to effect a corresponding selective adjustment of he rate changing transmission 147 for selectively varying the output rate therefrom.

From the fee changing transmission 147, power is transmitted to rotate an output shaft 152 rotatably journalled therein at a selected feeding rate. A gear 153 secured to the shaft 152 is adapted to meshingly engage a complementary gear 154 connected to rotate the driving portion of an overrunning clutch mechanism 156. The driven portion of the overrunning clutch mechanism 156 functions in well known manner to transmit driving power to rotate the concentrically rotatable driven portion thereof which is fixedly secured to a horizontal shaft 157 carrying at its opposite end a transfer gear 158. The transfer gear 158 is disposed to meshingly engage an idler pinion 159 secured to an idler shaft 160 journalled in the knee 21 and having secured to its opposite end another idler pinion 161. The idler shaft 160 together with the pinions 159 and 161 secured thereto are operatively connected to transmit feed driving power to a plurality of disconnectable reversing mechanisms 163, 164 and 165 that are respectively engageable to transmit power for driving the knee 21, the saddle 22, and the table 23.

The idler pinion 159 is disposed to engage a wide faced reversing gear 167 journalled to freely rotate on a horizontal knee driving shaft 168 that is in turn journalled to rotate in the knee. From the reversing gear 167, power is transmitted to rotate another reversing gear 169, constituting a part of the saddle reversing mechanism 163, and that is freely journalled to rotate on a cross feed screw 170 journalled at its forward end to rotate in the knee 21 and having meshing engagement with a stationary cross feed nut 171 secured to a bracket 172 depending from the underside of the saddle 22. To minimize friction and provide for rapid response, particularly in automatic copy drive, the cross feed screw 170 and nut 171 are of the antifriction type. As more clearly shown in Fig. 12, the nut 171 is provided with an internally formed ball receiving groove and cooperating return tube to constitute a continuous ball pathway, the screw 170 is likewise provided with a helically formed ball receiving groove that is adapted to cooperate with the groove within the nut 171 in a manner that a plurality of bearing balls are operatively constrained therebetween for recirculating movement. In a similar manner, the idler pinion 161, is disposed to engage a wide faced reversing gear 174 journalled to rotate on the forward end of the cross feed screw 170 and that is disposed to meshingly engage a complementary reversing gear 175 journalled to rotate on the forward end of the knee driving shaft 168.

By means of this arrangement, the knee driving gears 167 and 175 associated with the knee reversing mechanism 163 are caused to rotate in opposite directions on the knee driving shaft 168. In like manner, the gears 169 and 174 associated with the saddle reversing mechanism 164 are caused to freely rotate in opposite directions on the forward end of the cross feed screw 170.

For driving the table 23 the wide faced gear 174 is disposed to engage a complementary spur gear 176 affixed to a horizontal splined drive shaft 173 journalled at its forward end in the knee 21. With its rearward end, as shown in Figs. 3 and 12, the horizontal shaft 173 is disposed to have driving splined engagement with the internally splined bore of a bevel gear 177 rotatably journalled in the depending bracket 172 secured to the underside of the saddle 22. The bevel gear 177 engages a complementary bevel gear 178 secured to one end of a vertical shaft 179 journalled in the saddle 22. At its opposite end the vertical shaft 179 is connected to drive a bevel gear 182 connected to engage a pair of reversing bevel gears 183 and 184 journalled to rotate in spaced apart relationship in concentric bored openings formed in vertically spaced ribs formed integrally with the upper portion of the saddle 22. As shown in Figs. 3 and 12, the bevel gears 183 and 184, constituting a portion of the table reversing mechanism 165, are thus caused to be rotated in opposite directions by rotation of the driving gear 182. The gears 183 and 184 are provided with internal, concentrically formed, bored openings adapted to rotatably support the opposite ends of a hollow drive sleeve 185 that is slidably splined to a table screw 187 journalled at its opposite ends in the table 23. The table screw 187 is adapted to meshingly engage a stationary feed nut 188 fixedly secured to the saddle 22. The table screw 187 is provided with a helically formed ball receiving groove 189 of semi-circular section adapted to constitute a helical ball race as more clearly shown in Figs. 12 and 13. The stationary nut 188 secured to the saddle 22 is of the recirculating ball type provided with a cooperating internally formed helical ball receiving groove 190 of semi-circular cross section. Return tubes 191 interconnecting the end portions of the ball groove 190 in the nut 188 are adapted to cooperate therewith in a manner to constrain a plurality of bearing balls 192 for recirculating movement between a portion of the groove 189 in the screw 187 and the cooperating groove 190 in the nut 188. Thus, because of the antifriction recirculating ball nut 188 and cooperating table feed screw 187, the slightest force applied to rotate the screw operates to effect immediate longitudinal movement of the table 23 relative to the supporting saddle 22. In like manner, the saddle 22 is movable along the knee 21 in response to the slightest rotative force applied to the ball receiving screw 170 that cooperates with the recirculating nut 171. The ball bearing screw and nut mechanisms respectively operable to move the saddle 22 and table 23 provide the means for attaining the rapidity of response and acceleration essential to the most efficient and accurate operation of a copy control system of the type set forth in this application.

For transmitting power to rotate the table feed screw 187 and thus move the table 23 in a selected direction of movement, as shown in Figs. 3 and 12, a movable clutch spool 197 is slidably splined to the outer periphery of the hollow drive sleeve 185 for axial movement intermediately the reversibly rotating bevel gears 183 and 184. The clutch spool 197 is provided at its opposite ends with clutch teeth respectively engageable with complementary clutch teeth formed on the inner opposed hubs of the gears 183 and 184. To effect shifting movement of the clutch 197 in either direction from a central neutral position into clutching engagement with one or another of the gears 183 and 184, an annular groove formed on the clutch spool is disposed to be engaged by a shifter fork 198, connected to be moved by a table directional shifter lever 199, Figs. 1, 10 and 11. The table directional lever 199 is movable either leftwardly or rightwardly from a central neutral position to shift the clutch spool 197, Fig. 12, and thus effect longitudinal movement of the work table 23 in a corresponding direction.

In a like manner, as shown in Fig. 3, the reversing gears 169 and 174 of the saddle reversing mechanism 164 are provided with inwardly extending clutch teeth that may be selectively engaged by clutch teeth formed at the opposite ends of a shiftable clutch collar 202 movably carried therebetween. The clutch collar 202 is slidably splined to the periphery of a sleeve 203 that is directly keyed to the forward end of the cross feed screw 170 intermediately of the freely rotatable gears. A shifter fork engaging an annular groove in the clutch collar 202 is connected by linkage (not shown) to be moved by shifting movement of a saddle directional lever 204 pivotally mounted at the front of the knee 22. The saddle directional lever 204 is likewise movable either leftwardly or rightwardly from a central neutral position to effect axial shifting movement of the clutch collar 202 into clutching engagement with one or another of the oppositely rotatable driving gears 169 and 174. Rotational movement of the cross feed screw 170 journalled in the knee 21, relative to the stationary nut, secured to the saddle 23, operates to effect selective transverse movement of the saddle along the knee either toward or away from the column 15.

Likewise, the gears 167 and 175 associated with the knee reversing mechanism 163 are provided with inwardly extending clutch teeth adapted to be engaged by clutch teeth formed at the opposite ends of a shiftable clutch collar 205. The clutch collar 205 is slidably splined to a sleeve 206 that is keyed directly to the forward end of the knee driving shaft 168. A movable shifter fork 209 engaging an annular groove formed in the collar is connected by means of linkage (not shown) to be moved by a knee directional shifter lever 210 for shifting the splined clutch collar 206 into clutching engagement with one or another of the reversibly rotatable gears 167 and 175. Whenever the knee directional lever 210 is pivoted either leftwardly or rightwardly from a neutral position to an engaged position, power is transmitted to rotate the horizontal shaft 168 journalled in the knee 21. A bevel gear 211 secured to the inner end of the shaft 168 is disposed to engage a complementary bevel gear 212 keyed to the upper end of a downwardly depending knee elevating screw 213 journalled at its upper end in the knee. Toward its lower end, the elevating screw 213 threadedly engages a stationary elevating screw nut 214 fixedly secured within a hollow tubular pedestal 215 attached at its lower end to the column base 16 as shown in Figs. 1, 2 and 3. Rotational movement of the elevating screw 213 relative to the stationary nut 214 operates in well known manner to effect selective vertical adjustment of the knee 21 along the front face of the column 15 above the base 16.

For moving the knee 21, saddle 22, and table 23 at a rapid traverse rate of speed, there is provided at the right side of the knee, as shown in Figs. 1 and 3, a pivotable rapid traverse lever 218 that is operatively connected to effect selective engagement of a rapid traverse clutch 219 in the knee 21. Whenever the rapid traverse clutch 219 is engaged and the main drive motor is energized, power is transmitted from the input shaft 127 via the clutch 219 to rotate a horizontal shaft 220 journalled in the knee 21. A gear 221 secured to the driven shaft 220 is disposed to engage the gear 176 which is interconnected in the feed drive train as hereinbefore explained. The gear 176 is thus operatively connected to rotate the reversing gears respectively associated with the knee reverse mechanism 163, the saddle reverse mechanism 164, and the table reverse mechanism 165 whenever the rapid traverse clutch 219 is engaged. The various driving gears of the reversing mechanisms are rotated at a rapid traverse rate irrespective of whether or not the feed drive train is engaged due to the overrunning clutch 156 being connected between the feed drive gear 154 and the shaft 157. Whenever the shaft 157 is caused to be rotated at a rapid rate by actuating the rapid traverse lever 218, the driven portion of the overrunning clutch 156 will be caused to overrun the driving portion thereof regardless of whether or not the feed driving gear 154 is rotating at a selected feeding rate.

For effecting selective manual adjustment of the saddle 22 and knee 21, there is provided at the front of the knee a manually rotatable handwheel 222 and handcrank 223. The handwheel 222 is rotatably journalled on the forwardly extending end of the cross feed screw 170 for a limited axial movement therealong. Whenever the saddle power feed directional lever 204 is in a neutral position, the handwheel 222 is movable inwardly in a manner that clutch teeth formed on the hub thereof are moved into meshing engagement with complementary clutch teeth formed on the clutch collar 225 pinned to the forward end of the cross feed screw 170 to effect selective transverse movement of the saddle 22 along the knee 21.

To effect manually controlled vertical adjustment of the knee 21, the handcrank 223 is rotatably journalled on the outer end of a horizontal idler shaft 226 journalled in the knee 21. The handcrank 223 is movable inwardly to move clutch teeth formed on the hub thereof into meshing engagement with complementary clutch teeth formed on a collar 227 pinned to the forward end of the shaft 226. A spur gear 228 secured to the inner end of the shaft 226 operates to rotate a complementary spur gear 229 secured to the knee driving shaft 168 for effecting selective manually operable vertical adjustment of the knee 21 along the column 15.

Figure 7:
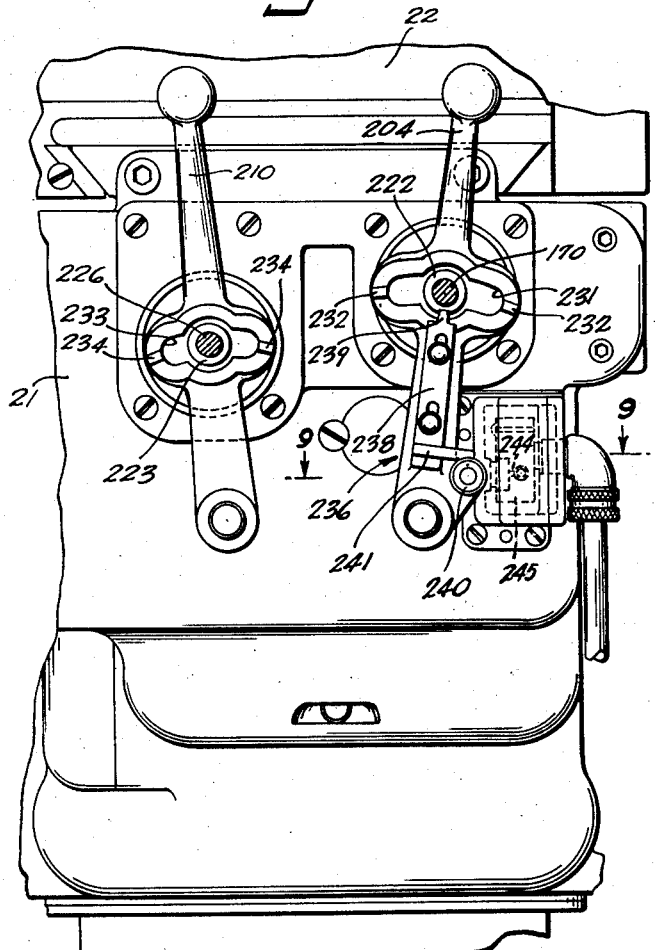
Fig. 7 is an enlarged fragmentary view in front elevation of the front of the knee and showing the clamp for the knee directional lever.
Figure 8:
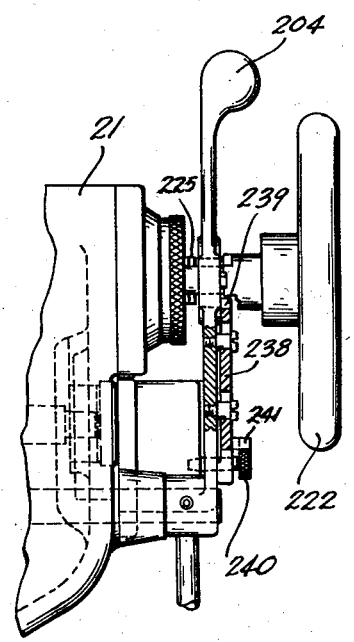
Fig. 8 is an enlarged fragmentary view in left side elevation of the front of the knee, and partly in vertical section through the clamp mechanism for the knee directional lever.

Interlocking means are provided to prevent engagement of the handwheel 222 or handcrank 223 whenever the power feed directional levers 204 and 210 respectively associated therewith are engaged. Likewise, means are provided to prevent engagement of the directional levers 204 and 210 whenever the handwheel 222 and handcrank 223 are engaged. To accomplish this, as shown in Figs. 3, 7 and 8, the saddle power feed directional lever 204 is provided with an arcuate slot 231 through which the outer end of the cross feed screw 170 extends. The central portion of the arcuate slot 231 is enlarged sufficiently to receive the inner circular hub of the handwheel 222 and thus to permit axial clutching movement of the handwheel whenever the lever 204 is positioned in its central neutral position as shown. With the handwheel 222 moved inwardly to clutch engaged position, the enlarged hub thereof, being of a larger diameter than the reduced end portions of the arcuate slot 231, precludes pivotal shifting movement of the lever 204.

When the directional lever 204 is shifted leftwardly or rightwardly to power engaged position, one of the end portions of the slot 231 encompasses the outer end of the cross feed screw 170 and acts as an interference ring to prevent inward movement of the handwheel 222. At the same time, as the power feed lever 204 is moved into engaged position, one of a pair of single clutch teeth 232 presented by the lever is moved into clutching engagement with the clutch teeth formed on the handwheel 204 to preclude rotational movement thereof whenever the cross feed screw 170 is being rotated under power.

In a similar manner, the knee power feed directional lever 210 is provided with an arcuate slot 233, the central portion of which is enlarged to permit axial shifting movement of the handcrank 223 whenever the lever 210 is in neutral disengaged position as shown in Figs. 3 and 7. The end portions of the slot 233 are of reduced size to preclude axail shiftable movement of the knee elevating crank 223 whenever the lever 210 is moved to its leftwardly or rightwardly engaged position. With the directional lever 210 pivoted, either leftwardly or rightwardly, into engaged power transmitting position, one or the other of a pair of separate individual clutch teeth 234 presented by the lever 210 are moved into engagement with clutch teeth formed on the handcrank 223 to prevent rotational movement thereof.

For operating the machine as a copying machine, there is provided an automatically operative photoelectronic copy control system that is connectable to effect a coordinately operative feeding movement of the saddle 22 and work table 23 entirely independently of the main drive motor 26 in the column base. The automatic copy control system is of the line tracking type and is generally similar to the control system fully disclosed in the copending patent application to T. A. Wetzel, Serial No. 246,980, filed September 17, 1951, and entitled, Automatic Copying Machine with Anticipator Control. When operated as a copy machine, the feeding movements of the saddle 22 and work table 23 are simultaneously and coordinately controlled in a manner that the work table 23 is caused to move along a resultant path of travel, relative to the tool spindle 18, and corresponding to the configuration of a guiding template or pattern. During a copying operation, the tool spindle 18 is connectable to be driven at a selected speed rate, as hereinbefore described, by the spindle driving train from the main drive motor 26, or alternatively, by the high speed motor 80 carried within the spindle head 17. Likewise, to facilitate the vertical advancement and withdrawal of a workpiece from engagement with a cutting tool during a copying operation, the knee elevating mechanism is connectable to be driven manually by the knee handcrank 223 as well as by the main drive motor 26 in the base. Thus, by engaging the knee directional lever 210, with the feed starting lever 44 or the rapid traverse laver 218 in engaged position, the knee 21 is vertically movable at feed or rapid traverse rate to effect a corresponding vertical movement of the work table 23 relative to the tool spindle 18 during a copying operation.

As a prerequisite to performing a copying operation, it is necessary to completely immobilize the normal power driving feed train as well as the manually operable driving means for both the saddle 22 and the work table 23. To this end, as shown in Figs. 7 and 10, there are provided a pair of combination electro-mechanical interlocking mechanisms 236 and 237 respectively disposed to latch the table directional lever and saddle directional lever in neutral disengaged position. In addition to this, the interlocking devices when in unlatched position, prevent movement of the saddle 22 and table 23 in response to the copy control system whenever the machine is to be operated for conventional milling operations. In a similar manner, the electro-mechanical interlocking mechanisms 236 and 237 are actuatable to preclude movement of the saddle 22 and table 23 for conventional milling operations when the copy control system is both mechanically connected and energizable to operate the machine for a copying operation. To condition the machine for performing a copying operation, there are provided at the front of the machine copy shifter levers 242 and 246 as shown in Fig. 1. The copy shifter levers 242 and 246 are movable from disengaged to engaged position for mechanically coupling the copy control system to effect movement of the table 23 and saddle 22 independently of the main drive motor 26, Fig. 2, during a copying operation. At the same time, the copy shifter levers 242 and 246 are disposed to actuate a second electrical interlocking system to preclude energization of the main drive motor 26 unless both the copy shifter levers as well as the interlocking mechanisms 236 and 237, associated, with the directional levers 204 and 199 are in proper predetermined position. Thus, the copy shifter levers 242 and 246 together with the interlocking devices 236 and 237 cooperate to constitute a double interlock disposed to preclude energization of either the main drive motor 26 or the copy control system whenever both are mechanically coupled to drive the table and the saddle.

In operation therefore, with the copy shifter levers 242 and 246 in disengaged position, the interlocking devices 236 and 237 must be in unlatched position in order to energize the main drive motor 26 for moving the table 23 and saddle 22 for performing a conventional milling operation. With the levers so positioned, the copy control system is not connectable to drive the saddle or the table. With the copy levers 242 and 246 in engaged position, on the other hand, neither the copy control system nor the main drive motor 26 can be energized. After the interlocking devices 236 and 237 are moved to latched position to prevent accidental engagement of the directional levers, however, both the copy control system and the main drive motor 26 are energizable. During this condition of operation, the copy control system is both energizable and connectable to effect automatically controlled movement of both the table 23 and saddle 22. At the same time, the main drive motor 26 is energizable and mechanically connectable to drive the tool spindle 18 and to effect selective vertical adjustment of the knee 21.

In certain other conditions of operation, as will hereinafter be more fully explained, the table 23 can be moved by the copy control system while the saddle 22 is connected to be moved by the main drive motor 26. In a similar manner, the table 23 can be connected to be moved by the main drive motor 26 while the saddle 22 is being driven by the copy control system.

The entire control system is so arranged as to facilitate a change-over for a selected mode of operation. It is not necessary to add or remove any attachments, nor is it necessary to retract from or move into operating position any major machine member. The entire operating and control mechanism for both conventional and copying operation is completely self-contained within the machine. In adapting the machine for a particular mode of operation, it is necessary only to properly position the required interlocking mechanisms and then operate the machine for either a conventional or a copying machine operation.

Figure 9:
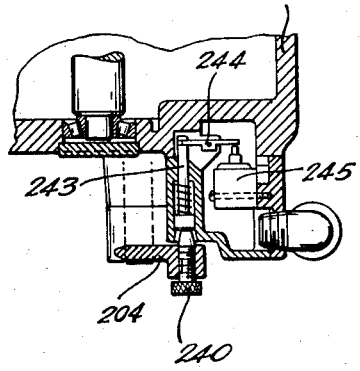
Fig. 9 is an enlarged fragmentary view in transverse horizontal section through the lower portion of the knee interlock and taken generally along the line 9—9 in Fig. 7.

To retain the power connecting cross feed directional lever 204 and cross feed handwheel 222 in disengaged position, the interlocking mechanism 236 is provided with a vertically movable member 238 slidably carried by the directional lever 204 for limited vertical movement as shown in Figs. 7, 8 and 9. At its upper end, the slidable member 238 is provided with a clutch tooth 239 adapted to be upwardly movable into latching engagement with the clutch teeth formed on the hub of the cross feed handwheel 222. With the slidable member 238 in upwardly latched position, as shown, the clutch tooth operates to prevent inward clutching movement of the handwheel 222 as well as to prevent frictional rotational movement thereof whenever the cross feed screw 170 is rotated in response to the copy control system. To retain the slidable member 238 in latching engagement with the handwheel 222, a knurled thumb screw 240 threaded in an enlarged lower portion of the cross feed directional lever 204 is turned inwardly in a manner that the outer periphery of the head thereof engages the underside of a lateral arm 241 secured to the longitudinally slidable member 238. As the knurled screw 240 is rotated to its inner position, the opposite end thereof is moved into engagement with a notch formed in the front wall of the knee 21 to latch the directional lever 204 in neutral disengaged position. At the same time, the extreme inner end of the thumb screw 240 effects inward movement of a horizontally slidable actuating plunger 243. The plunger 243, in turn, effects movement of a pivotal member 244 that is connected to depress the actuating button of a double throw switch 245 carried in the knee. The normally open, double throw switch 245 is interconnected in a low voltage control circuit. Since the switch 245 is of the double throw type, it operates to complete separate control circuits in either its normally open position or when actuated to a closed position. In normally open position the switch 245 operates only to complete a circuit for the main drive motor 26. After being actuated to a closed position by movement of the thumb screw 240, the switch 245 operates both to complete a control circuit for the feed motor and also to complete another control circuit to permit energization of the copy control system.

As the thumb screw 240 is rotated outwardly, from its latched position, the switch 245 is actuated to its normally open position to preclude energization of the copy control circuit. At the same time, the slidable member 238 will move downwardly in disengaged position relative to the manually operable handwheel 222. Whenever the slidable member 238 is in its lowermost disengaged position, the lateral arm 241 secured thereto engages the inner face of the knurled head of the thumb screw 240 to prevent accidental inward movement thereof during conventional milling operations.

In like manner, the interlocking mechanism 237 for the table drive, as shown in Figs. 10 and 11, comprises a knurled thumb screw 247 threaded in the forward portion of the table directional lever 199 in combination with a normally closed, double throw switch 249 operatively interconnected in the low voltage control circuit for both the main drive motor 26 and the copy control system. With the thumb screw 249 rotated downwardly the inner end thereof is moved into latching engagement with a notch formed in the saddle 22 to clamp the table directional lever 199 in a neutral disengaged position. The inner end of the thumb screw 247 operates to move one end of a pivotally mounted lever arm 250 downwardly, the opposite end thereof being connected to elevate a vertical actuating plunger 251 for permitting upward movement of the switch actuating plunger 252 to allow movement of the switch to its normally closed position. Whenever the thumb screw 247 is withdrawn from latching engagement with the saddle 22, the actuating plunger 251 is urged downwardly by a spring 253 to actuate the switch to an open circuit interrupting position to prevent energization of the copy control circuit. In both open and closed position, the double throw switch 249 is likewise operative to complete separate control circuits to permit energization of the main drive motor 26.

Before operating the machine for performing a copying operation, it is necessary that both of the double throw interlocking switches 245, Fig. 7, and 249, Fig. 10, be actuated to a closed position. As a necessary concomitant of effecting closure of the switches, the several controlling levers for effecting conventional feeding movement of the saddle 22 and table 23 are locked in a neutral disengaged position. Thus, mechanism for driving the saddle 22 and work table 23 during a copying operation is inoperable whenever the saddle or the table are adapted to be moved for a conventional milling machine operation. Likewise, during a copying operation, neither the saddle nor the table is movable in response to the driving mechanism for performing a conventional milling machine operation. Inasmuch as certain of the mechanism for moving the saddle and work table is common to both copy machine operation, as well as conventional milling machine operation, the control mechanism is arranged to positively preclude simultaneous engagement of the copy drive and conventional drive to prevent inadvertent damage to the driving mechanism. However, the controlling mechanism is so integrated and arranged as to permit an immediate change-over from conventional milling operation to copying operation or vice versa.

During a copying operation, as shown in Figs. 2 and 3, power for driving the saddle 22 and work table 23 is derived from a pair of copy feed motors 255 and 256 respectively secured to the leftward side of the knee 21 and the left end of the table 23. From the saddle driving motor 255, power is transmitted to drive a worm 257 having meshing engagement with a wormwheel 258 freely journalled to rotate on a shaft 259. The shaft 259 is journalled to rotate in the knee 21 and is splined at its inner end to carry an axially slidable clutch element 260 that is splined thereto for selective shiftable movement. The clutch element 260 is provided with clutch teeth adapted to be moved into clutching engagement with complementary clutch teeth formed on the hub of the wormwheel 258.

With the clutch element 260 in clutching engagement with the wormwheel 258, as shown in Fig. 3, power is transmitted to drive the shaft 259 whenever the cross feed copy motor 255 for the saddle is energized to rotate. At its outwardly extending end, the shaft 259 is likewise splined to receive a removable feed range change pick-off gear 262 having meshing engagement with another removable feed range change pick-off gear 263 removably mounted on the outwardly splined end of a horizontal shaft 264 journalled in the knee 21. The pick-off gears 262 and 263 constitute two gears of a complete set of range change gears (not shown) that are removably and interchangeably mounted on the splined ends of the shafts 259 and 264 for selectively varying the driving ratio therebetween. From the horizontal shaft 264 journalled in the knee 21, a bevel gear 265 secured thereto is adapted to transmit power for rotating a complementary bevel gear 266 secured to the outer end of the cross feed screw 170. The cross feed screw 170 is thus connectable to be rotated by the infinitely variable speed copy feed motor 255 throughout a range of operating speeds dependent upon the selected range change pick-off gears applied to the shafts 259 and 264 respectively.

For selectively moving the clutch element 260, Fig. 3, into engagement with the wormwheel 258, a shifter fork 268 engaging an annular groove in the hub of the clutch element 260 is connected by means of linkage (not shown) to be selectively moved by the shifter lever 246, Fig. 1, pivotally mounted on the lower left front face of the knee 21. Movement of the shifter fork 268 is operative to effect movement of an actuating plunger for a double throw interlocking switch 261 in a corresponding direction. As the clutch element 260 is shifted into engaged position, the actuating plunger of the switch 261 is resiliently biased outwardly. Movement of the shifter fork 268 to disengage the clutch element 260 likewise depresses the actuating plunger of the switch 261 to its inward position.

In a similar manner, as shown in Figs. 2 and 3, the copy feed motor 256 mounted on the leftward end of the table 23 is connected to rotate a worm 270 having meshing engagement with a cooperatively driven wormwheel 271 journalled to rotate on a horizontal stub shaft 272. The shaft 272 is journalled to rotate within a housing 273 depending from the leftward end of the table and is provided with a splined end adapted to movably carry a clutch spool 274 slidably splined thereto. The clutch spool 274 is provided with clutch teeth adapted to be moved into meshing engagement with complementary clutch teeth formed on the hub of the wormwheel 271 for transmitting power therebetween to rotate the shaft 272. To effect shiftable movement of the clutch spool 274, a shifter fork 275 engaging an annular groove formed therein is connected to be moved by the shifter lever 242 as shown in Figs. 1 and 3. Shiftable movement of the fork 275 is operatively arranged to effect a corresponding movement of an actuating plunger for another double throw interlocking switch 285 that is operatively interconnected in the control circuits for the main drive motor 26 and the copy control system.

The shaft 272 is provided with an oppositely splined end disposed to extend outwardly into a pick-off gear compartment within the housing 273 to removably receive a pick-off range change gear 276. The pick-off gear 276, in turn, is disposed to meshingly engage a complementary pick-off gear 277 removably mounted on a splined extension 278 secured to the table feed screw 187 and adapted to extend outwardly into the pick-off change gear compartment. The pick-off gears constitute two of a set of pick-off gears (not shown) that are adapted to be removably and interchangeably mounted on the splined ends of the shaft 272 and the table screw extension 278 for selectively varying the range of speeds at which power is transmitted therebetween. To retain the gears 276 and 277 in driving engagement, there is provided a cover plate 279 that is removably secured to the housing 273.

Whenever the machine is to be operated for performing a copying operation, the cross feed screw 170 and the table feed screw 187 may be rotated through identical feed ranges. To effect this result, matched pairs of pick-off gears, such as the cross feed range change gears 262 and 263 and the table gears 276 and 277, are respectively connected to transmit copy feed power for moving the saddle 22 and table 23 through the same ranges of feed movement. During a copying operation, the work table 23 is moved along a resultant path of travel corresponding to the configuration of a guiding pattern and that varies in accordance with the direction and rate of movement of the saddle 22 and table 23 respectively as dictated by a guiding pattern. However, for some operations, it may be advantageous to utilize the copy system to achieve an automatic cycle effect by using unmatched pairs of pick-off gears. For example, the saddle may then be moved at a slow rate and the table at a much faster rate of speed.

To support a pattern in a position to guide copy feeding movements of the saddle 22 and table 23, there is provided a pattern support 280 fixedly secured to the leftward forward edge of the table 23, as shown in Figs. 1 and 2. The pattern support 280 comprises a substantially U-shaped frame 281 provided with forwardly extending arms 282 and 283 adapted to removably support a transparent plate 284 for supporting a pattern in exact parallelism with the top surface of the work table 23. The transparent pattern supporting plate 284, as shown in Figs. 1, 2 and 15, is thus carried for relative movement in a horizontal plane in interposed relationship between a light source 286 and a light passing shutter head or sensing device 287, the light source and sensing device being fixedly secured to the knee 21 in vertically spaced apart relationship. The light source 286 is supported within a hollow horizontal arm 288 that is pivotally mounted at its forward end upon a control cabinet 289 integrally formed with the hollow knee 21. An angular reflective mirror 290 carried within the forward portion of the arm 288 is adapted to reflect a beam of light from the source 286 downwardly through the transparent support plate 284 toward the light passing sensing device or shutter head 287. By means of its pivotal mounting, the horizontal arm 288 is pivotally movable from its normal operating position, shown in Figs. 2 and 15, in order to obtain access to the transparent support plate 284 and the shutter head 287. During a copying operation, however, the arm 288 is so positioned as to direct a beam of light vertically downward toward the shutter head 287 which is carried in fixedly spaced relationship to the depending vertical tool spindle 18.

The shutter head 287 is mounted on the upper end of a hollow motor shaft 292 that is driven at synchronous speed, for example 3600 R. P. M., by a shutter driving motor 293 carried in the control cabinet 289. A shutter 294, removably carried by the shutter head 287, is provided with a D-shaped aperture 295 adapted to pass light pulses downwardly through the hollow motor shaft 292 to actuate a photocell 296 mounted therebelow within the control box 289.

During a copying operation, as shown in Fig. 15, the axis of the shutter head 287 is continuously maintained a fixed distance from the guiding edge of an opaque pattern, such as the pattern 302, and under the opaque zone. The D-shaped aperture 295 in the shutter 294 is positioned eccentrically with respect to the rotational axis of the shutter head 287 in a manner that one end of the aperture overlaps the guiding edge of the opaque pattern 302 once during each cycle of rotation. The resultant light pulses passed during successive cycles of rotation vary in duration and periodicity according to the instantaneous angular direction of the pattern edge relative to the shutter head at the instant the aperture 295 overlaps the pattern edge to pass a particular light pulse. The successive light pulses passed by the shutter aperture 295, as it overlaps successive edge zones along the guiding pattern edge, blend together to produce a continuous control signal that is adapted to produce a coordinated movement of the saddle 22 and work table 23. Thus, the pattern support 284 and pattern 302 are traversed along a path of travel corresponding to the configuration of the pattern, and with the guiding edge thereof being continuously maintained a fixed distance from the rotational axis of the shutter head 287 in response to the light pulses passed by the rotating aperture.

As the pattern support 284 is moved along a predetermined path of travel during a copying operation, the work table 23 is likewise moved along a corresponding path of travel relative to the vertical tool spindle 18. With a suitable cutter (not shown) mounted in the tool spindle 18, to engage a workpiece (not shown) mounted on the table 23, the machine is operable to generate a contour in the workpiece that corresponds to the configuration of the guiding pattern 302 or any other pattern of selected configuration.

For coordinately energizing the copy feed motors 255 and 256 during a copying operation, the copy signal light pulses passed by the rotating shutter 294 are directed downwardly through the hollow motor shaft 292 to actuate the photocell 296 as shown in Fig. 15. The photocell 296 is connected by means of a pair of conductors 304 and 305 to supply a continuous copy control signal to the copy control circuit 306, shown schematically within the dotted lines in Fig. 15. As shown in the drawings, the photoelectronic copy control circuit 306 comprises essentially a rectifier 307, a signal amplifier 308, a translator 309, and a pair of motor controllers 311 and 312. The translator 309 is provided with four quadrature phase spaced vacuum tubes (not shown) that are arranged to be sequentially operative in overlapping relationship in a manner to constitute an electrical commutating timing circuit that operates in exact synchronism with the rotating shutter head 287. The complete construction and interconnection of the various major elements constituting the complete copy control circuit are fully shown and described in the aforementioned copending patent application, Serial No. 246,980, filed September 17, 1951.

The light pulses passed by the rotating shutter 294 as the D-shaped aperture 295 overlaps the edge of the opaque pattern 302 once during each cycle of movement operate to automatically control copying movement for reproducing workpieces corresponding in configuration to the pattern. In traversing corners or abrupt changes in direction, however, there may occur a slight overtravel in the original direction of tracing movement, thus impairing the accuracy of the finished workpiece. To obviate this difficulty, there is provided an anticipating control mechanism 314 comprising a second light passing aperture or anticipating hole 315 in the shutter 294 in combination with a rotatable blanker 316 positioned immediately above and concentric with the shutter head 287 as shown in Fig. 15. The blanker 316 is provided with an enlarged circular opening 317 and a radially extending notch 318 that is automatically and continuously oriented to point in a direction generally opposite to the direction of copying movement. The blanker 316 operates to prevent the anticipating hole 315 from passing a light impulse during its entire cycle of rotation when traversing a straight portion of a guiding pattern. At the occurrence of a change in pattern direction, the notched opening 318 permits the anticipating hole 315 to pass light that modifies the effect of the copy signal light pulse passed by the copy aperture 295 to effect a deceleration in the feeding rate prior to the shutter head 287 traversing a corner, or a change in direction of the pattern to prevent overtravel and the attendant damage to the workpiece.

The blanker 316 is connected to be rotatably driven by a gear train including spur gears 320 and 321, the latter of which is driven by a D. C. selsyn motor 322. The D. C. selsyn 322 operates as a positioning motor only, and is provided with a rotor that rotates to a relatively fixed angular position with respect to field windings 325, 326, 327 and 328 in accordance with the relative magnitude and polarity of two separate D. C. voltages.

Energy for activating the D. C. selsyn 322 is derived from the main supply conductors that are operatively connected to supply direct current to the armature terminals of the reversible copy feed motors 255 and 256. As shown in Fig. 15, two of the selsyn field windings 325 and 326 are connected in series to a pair of conductors 329 and 330 leading to the armature terminals of the table driving copy feed motor 256. In like manner, the other two of the selsyn field windings 327 and 328 are connected in series to the armature terminals of the saddle driving copy feed motor 255 by a pair of conductors 331 and 332. With the copy feed motors 255 and 256 energized to rotate for effecting directionally controlled movement of the table 23, the selsyn field windings 325 and 326, as well as the windings 327 and 328, are proportionately energized by the applied E. M. F. to the copy motors 255 and 256 to angularly position the rotor of the selsyn 322, which may be of the permanent magnet type. A D. C. generator 323 is operatively connected to provide a snubbing action on the selsyn 322 to prevent oscillation of the blanker 316 as it is oriented to a new position.

The operative details of the complete control circuit for effecting selective energization of the main motor 26 in the base, the high speed spindle head motor 80, and the copy feed motors 255 and 256 are illustrated in simplified diagrammatic form in Fig. 15. As there shown, electrical energy for operating the various motors and control elements is derived from line conductors $L_1$, $L_2$ and $L_3$, the line conductors being connected to a source of power by means of a disconnecting switch 334 in the usual manner. In order to energize the motors or any of the control elements, it is necessary to energize a main control circuit that is represented by light lines in the drawings. Power for the main control circuit is obtained from a transformer 335 having a primary winding 336, one terminal of which is connected to the line conductor $L_1$, and one of the other line conductors, in this instance the conductor $L_3$ being connected to one or another of a series of taps on the primary winding depending on the voltage of the supply current. A secondary winding 337 of the transformer 335 is adapted to supply energy at the desired voltage for the main control circuit. Although not shown in the drawings, the usual fuses and overload devices are interconnected at appropriate points in the control circuit in well known manner to afford protection to the entire apparatus in the event of a short circuit or other overload condition.

Energization of the main control circuit for the entire machine is effected by depressing a normally open master switch start button 339 constituting part of a master control station, that is provided with a master switch stop button 341. With the master start switch 339 moved to momentary closed position, current will flow from one terminal of the transformer secondary 337 through a conductor 342, the normally closed contact bar of the master stop switch 341, a conductor 343 and the closed contact bar of the master start switch 339 to a conductor 353. From the conductor 353, the flow of current continues through a coil 345 of a master start relay 346 to a conductor 347, and an energized conductor 348 connected to the opposite terminal of the transformer secondary 337. Energization of the solenoid coil 345 in this manner causes the master control relay 346 to move to a closed position, thereby effecting closure of three sets of contact bars. A holding circuit for retaining the master relay 346 in closed position when the master start button 339 is released, is then established through a shunting conductor 349 leading from the conductor 343 interconnected between the master push button switches 339 and 341. From the conductor 349, the holding circuit continues, through one set of contacts and a closed contact bar of the relay 346 to a conductor 351, and thence through another closed contact bar to the conductor 353 leading to one terminal of the coil 345.

With the master control relay 346 in closed position, an energized control circuit is established from one terminal of the transformer secondary winding 337, the conductor 342, a conductor 354, and a closed contact bar of the relay 346, to energize a conductor 356. Whenever the conductor 356 is energized, the various other control elements and switches of the master control circuit are selectively operable to energize one or another of the motors, as well as the copy control circuit. On the other hand, depressing the master push button stop switch 341 interrupts the holding circuit to the coil 345, permitting the master relay 346 to drop to an open position to interrupt the flow of current to the conductor 356 to deenergize the master control circuit.

With the master relay 346 closed to energize the conductor 356, a circuit may be completed through a conductor 357 leading to a pair of motor start push button switches 358 and 359 adapted to selectively control the energization of the main drive motor 26, as well as to condition a control circuit for selectively energizing the separate high speed spindle driving motor 80. Energization of the main drive motor 26 is effected by momentarily depressing the normally open push button switch 359 to energize a coil 360 of a relay 361 by completing a circuit leading from the energized conductor 357, through the normally closed contact bar of the stop button switch 358, the closed contact bar of the start switch 359 to a conductor 362 connected to one terminal of the solenoidal coil of the relay. Current flowing through the coil 360 effects its energization, resulting in upward movement of the relay 361 to a closed position, and with a return circuit from the coil 360 being completed through a conductor 363 connected to the energized return conductor 348. Movement of the relay 361 to a closed position in turn effects movement of the contact bars to bridge three sets of contacts associated therewith.

Upon release of the normally open push button switch 359, a holding circuit for the relay 361 is established through a shunting conductor 365 leading from one terminal of the normally closed push button switch 358, through the closed contact bar of the relay 359 to a conductor 367, and thence through another closed contact bar to a conductor 369 connected to one terminal of the coil 360. With the relay 361 energized to a closed position, the energized conductor 356 is connected through the closed contact bar thereof to energize a conductor 371. From the energized conductor 371, a control circuit for energizing the motor 26 is then completed through conductor 373 and a normally closed interlocking contact bar 374 of a starting relay 375 for the high speed spindle motor 80. With the relay 375 in normally open position, the control circuit continues through the normally closed contact bar 374 thereof to a conductor 376 and thence through a conductor 377 to one terminal of the switch 249 associated with the table interlocking mechanism 237, Fig. 11. With the thumb screw 247 moved inwardly to latch the table directional lever 199 in a neutral disengaged position, the contact bar 333 of the double throw switch 249 is moved to its outer closed position as shown in Fig. 15. The main motor control circuit then continues from the conductor 377, through the closed contact bar 333 of the interlocking switch 249 to a conductor 338 connected at its opposite end to one terminal of the switch 285 that is connected to be actuated by the table copy clutch lever 242, Figs. 1 and 3. With the lever 242 positioned to move the table copy clutch 274 into engagement for coupling the table copy feed motor 256 to drive the table 23, the contact bar 344 of the switch 285 will then be positioned as shown in Fig. 15. Thus, the control circuit continues from the conductor 338 through the closed contact bar 344 of the switch 285 to a conductor 350 connected to one terminal of a coil 378 for the main motor starting relay 380.

The return circuit from the coil 378 continues through a conductor 352, through the closed contact bar 355 of the switch 261 to a conductor 364. From the conductor 364, the circuit continues through the closed contact bar 368 of the switch 245 to a conductor 370 connected to the energized return conductor 348. To position the contact bar 355 of the switch 261 as described, it is necessary that the copy shifter lever 246, Fig. 1, be positioned to retain the clutch element 260, Fig. 3, in engaged position for coupling the copy feed motor 255 into driving engagement with the saddle 22. In a similar manner, it is necessary that the thumb screw 240, Fig. 7, be rotated into latched position for locking the saddle directional lever 204 in a neutral disengaged position to position the contact bar 368 of the switch 245 as shown in Fig. 15. Thus, with the contact bars of the interlocking switches 245, 249, 261 and 285 positioned as described and as shown in Fig. 15, a control circuit is completed for energizing the coil 378 to urge the relay 380 to an upwardly closed position. Closure of the relay 380 in turn effects movement of the three contact bars thereof into closed position for transmitting current from the line conductors $L_1$, $L_2$ and $L_3$ to the conductors 381, 382 and 383 that are connected to energize the main driving motor 26.

It will be apparent therefore, that the main drive motor 26 is energizable whenever the copy control clutches 260 and 274, Fig. 3, are in engaged position providing the table directional lever 199, Fig. 10, and the saddle directional lever 204, Fig. 7, are latched in a neutral disengaged position. During this condition of operation, the contact bars of a pair of interlocking relays 319 and 379, Fig. 15, connected in the copy control system 306 are in normally closed position to permit movement of the saddle 22 and table 23 in response to copy control signals.

As soon as the table directional lever 199, Fig. 10, and the saddle lever 204, Fig. 7, are unlatched, by outward movement of the thumb screws associated therewith, the relays 319 and 379 are energized to open position to preclude movement of the saddle 22 and table 23 at copy rate. Unlatching the directional levers 199 and 204 operates to reposition the contact bars 333 and 368 of the switches 249 and 245 respectively, thus interrupting the holding circuit to the conductors 338 and 364 to deenergize the relay 380 and main motor 26. With the copy clutches 260 and 274, Fig. 3, still in engagement, however, the saddle 22 and table 23 cannot be moved under power, either by the main motor 26 or the copy control system. To fully condition the machine for a conventional milling operation, it is necessary to disengage the copy clutches 260 and 274, Fig. 3, and simultaneously therewith, effecting movement of the contact bars 355 and 344, Fig. 15, of the switches 261 and 285 to their opposite closed positions.

With all of the contact bars of the switches 245, 249, 261 and 285 now moved to their opposite closed positions (from that shown in Fig. 15) the main drive motor 26 is restarted, providing the main motor control relay 361 has not been deenergized by depressing the stop button 358. During conventional operation, the control circuit for the coil 378 of the relay 380 extends from the conductor 377, through the contact bar 333 of the switch 249 to a conductor 381. The circuit continues from the conductor 381, through the contact bar 344 to the conductor 350, and through the coil 378 to the conductor 352. The return circuit is then completed through the contact bar 355, a conductor 386, the contact bar 368 to the conductor 370 connected to the energized return conductor 348. During this condition of operation, the saddle 22 and table 23 are adapted to be driven by the main drive motor 26 for performing conventional milling operations. At the same time, the normally closed relays 319 and 379 are energized to an upward position to interrupt the copy control circuit.

Whenever the table directional lever 199, Fig. 10, is unlatched by withdrawing the thumb screw 247, a holding circuit for energizing the relay 379, Fig. 15, to open position is completed from the contact bar 333 of the switch 249 through the conductors 381 and 393 to one terminal of a coil for the relay 379. The holding circuit continues through the coil to a conductor 408 that is connected to one terminal of a secondary winding of a low voltage transformer 410. The opposite terminal of the transformer secondary is connected through another conductor 416, the conductors 376 and 377 to the contact bar 333 of the switch to complete a secondary control circuit for energizing the relay 379 to an open position. Power for energizing the primary winding of the transformer 410 is derived from branch conductors that are connected through conductors 423 and 430 to the energized conductors 348 and 417 respectively.

In a similar manner, with the saddle directional lever 204, Fig. 7, unlatched, the contact bar 368 of the switch 245 is positioned to complete a holding circuit to the conductors 386 and 399 connected to the energized secondary winding of a low voltage transformer 439. The circuit continues through a conductor 444, the coil of the relay 319 and thence through conductors 455 and 370 to the contact bar 368 of the switch 245. The primary winding of the low voltage control transformer 439 is connected to be energized by conductors 423 and 430 that are connected directly to the energized conductors 348 and 417 respectively.

As a prerequisite to energizing the high speed motor 80 for driving the spindle at high speed rates, it is necessary to pivot the shifter crank 75, Fig. 5, downwardly to shift the spindle driving gear 65 upwardly into disengaged position. Movement of the gear 65 to its upward position operates to interrupt the transmission of power from the main drive motor 26 to the spindle 18, and, simultaneously therewith, actuates the normally open interlocking switch 121, Figs. 5 and 15, to a closed position for permitting selective energization of the high speed spindle driving motor 80. With the interlocking switch 121 closed, a normally open start button switch 122 associated with the high speed spindle motor 80 may be momentarily depressed for completing a control circuit from the energized conductor 371, a branch conductor 383 and through the contact bar of a normally closed spindle stop button switch 384. The circuit continues through a conductor 385, and thence through the closed contact bar of the start switch 122 to one terminal of a solenoidal coil 387 of a relay 388. From the opposite terminal of the coil 387, the circuit continues through a conductor 389, the contact bar of the closed interlocking switch 121, and a conductor 390 connected to the energized return conductor 348. Closure of the start button switch 122 thus effects energization of the coil 387, whenever the interlocking switch 121 is moved to closed position, which in turn, operates to move the three sets of contacts associated therewith. A holding circuit for the relay 388 is then established from one terminal of the coil 387 through the upper closed contact bar to a conductor 391 and through another closed contact bar to a shunting conductor 392 to the conductor 385 interconnected between the stop switch 384 and the start switch 382.

With the relay 388 being retained in closed position, a control circuit is then established from the energized conductor 371, through the closed contact bar of the relay 388 leading to a conductor 394 connected at its opposite end to one terminal of a coil 396 of the starting relay 375 for the high speed motor 80. The flow of current continues through the coil 396 to a conductor 397 and a conductor 398 connected to the energized return conductor 348. The control circuit thus completed effects energization of the coil 396 to move the contact bars of the relay 375 upwardly for energizing the high speed spindle motor 80 and, simultaneously therewith, de-energizing the main drive motor 26 in the base. Upward movement of the relay 375 effects movement of the three contact bars 402, 403 and 404 into position for bridging the three pairs of contacts associated therewith for transmitting current from the line conductors $L_1$, $L_2$ and $L_3$ to the branch conductors 405, 406 and 407, for energizing the high speed spindle motor 80. At the same time, the normally closed contact bar 374 of the relay 375 is moved upwardly to an open position to interrupt the holding circuit to the coil 378 of the relay 380, thus allowing the relay to drop to open position for deenergizing the main drive motor 26.

In the event it is desired to re-energize the main motor 26 when the high speed spindle motor 80 is operating, there is provided an additional switch 409 that is selectively operable to complete a shunt control circuit for energizing the coil 378 whenever the normally closed contact bar 374 of the relay 375 is moved to open position. Actuating the switch 409 to a closed position operates to complete a shunt control circuit from the energized conductor 373, the closed contact bar of the switch 409 directly to the conductor 377. Thus, closure of the switch 409 effects movement of the relay 380 to a closed position for re-energizing the main drive motor 26 in the base. By means of this arrangement, the main drive motor 26 is energizable for driving one or another of the work supporting members 21, 22 and 23 when the spindle 18 is being driven at high speeds by the high speed motor 80. Likewise, with the spindle 18 being operated at high speeds and the copy control system 306 connected to effect a coordinated movement of the saddle 22 and table 23, the main drive motor 26 is operatively energizable to effet power controlled vertical adjustment of the knee 21.

Whenever the master control relay 346 is actuated to closed position, another control circuit is energizable to activate the copy control system 306 for coordinately moving the saddle 22 and table 23 according to the dictates of a guiding pattern, such as the pattern 302, to effect a resultant movement of the table 23 along a path of travel corresponding to the configuration of the guiding pattern. As a prerequisite to performing a copying operation, it is necessary to lock the saddle directional lever 204 and table directional lever 199 in neutral disengaged position. This is accomplished by actuating the saddle lever clamp mechanism 237 and table lever clamp mechanism 236 to closed position as fully explained hereinbefore. Movement of the respective clamp mechanisms 236 and 237 to closed clamped position effects movement of the respective contact bars of the interlocking switches 245 and 249, Figs. 9, 11 and 15, to the closed circuit completing positions shown in Fig. 15. It is likewise necessary to shift the copy clutches 260 and 274, Fig. 3, into engaged position and thereby actuate the respective contact bars of the interlocking switches 261 and 285 into the circuit completing positions, shown in Fig. 15. With the machine thus predeterminately conditioned for copying operation, a tracer control switch 411 is selectively actuatable to closed position for energizing the tracer control system 306, providing the main control switch 339 has been actuated to energize the main supply conductor 356.

Movement of the tracer control switch 411 to closed position operates to complete a control circuit that simultaneously energizes the solenoidal coils 412 and 413 respectively associated with a time delay relay 414 and a tracer control relay 415. The control circuit thus completed begins with the energized conductor 356, and extends through a conductor 417 to one terminal of the tracer control switch 411. The flow of current continues through the contact bar of the switch 411 to a conductor 419, a conductor 420 and thence through a branch conductor 422 to the solenoidal coil 412 of the time delay relay 414. The return circuit from the coil 412 is then completed through a branch conductor leading to the energized return conductor 348. Energization of the coil 412 operates to move the contact bar 426 of the time delay relay 414 to a position bridging a pair of contacts associated therewith after a predetermined timed interval.

Simultaneously with the energization of the time delay relay coil 412, the control circuit from the tracer starting switch 411 continues through the energized conductor 420 to a conductor 427 connected to one terminal of the solenoidal coil 413 of the tracer control relay 415. The circuit continues through the coil 413 to the conductor 398 connected to the energized main return conductor 348. Energization of the solenoidal coil 413 effects upward movement of the relay 415 to move the three contact bars thereof into closed position for transmitting current from the line conductors $L_1$, $L_2$ and $L_3$ to three conductors 432, 433 and 434 that are connected to energize the rectifier 307. Current from the conductors 432, 433 and 434 is transmitted through one set of conductors 436, 437 and 438, to energize the armature of the synchronous shutter head motor 293, the fields 438 of which are energized by direct current through a pair of conductors 440 and 441 respectively connected to a pair of conductors 442 and 443 leading from the rectifier 307. Two of the conductors, 437 and 438, likewise are connected through a transformer to energize the light source 286 which is preferably of the zirconium arc type.

Direct current likewise flows from the rectifier 307 through the conductors 442 and 443 to the amplifier 308 which is operatively connected to amplify the input copy signal supplied from the photocell 296 through the conductors 304 and 305. Momentarily, during the initial starting or warm-up period, the spurious amplified output signal from the amplifier 308 flows through a conductor 445, a conductor 446, and thence through a conductor 447, a normally closed contact bar 448 of a signal interrupting relay 449 to a conductor 450. From the conductor 450, the flow of the amplified output signal continues through a common conductor 451 connected directly to the cathodes of the four quadrature phase spaced tubes (not shown) within the translator 309 to render all of the tubes momentarily conductive during the initial starting period.

At the same time, closure of the tracer control relay 415 likewise causes a flow of main supply current from the conductors 436, 437 and 438 through branch conductors 452, 453 and 454 to Scott-connected transformers (not shown) associated with the translator to supply power to the tubes contained therein and to the filaments thereof to be heated. However, since the input signal from the common conductor 451 is momentarily connected directly to the cathodes of the tubes within the translator 309, the tubes are all conductive to supply current for activating the motor controllers 311 and 312 during the initial starting or warm-up period. With all of the tubes within the translator conductive, the net effect on the motor controllers is to all practical purposes, the same as if none of the tubes were conductive.

During the initial starting period, direct current is likewise transmitted from the energized rectifier 307 through the conductors 442 and 443, the conductors 440 and 441, to a pair of conductors 459 and 460 connected to supply direct current for energizing the field windings 461 and 462 respectively associated with the saddle copy feed motor 255 and the table copy feed motor 256. At the same time, however, the flow of three phase line current to the respective copy motor controllers 311 and 312 is interrupted by a normally open motor controller relay 464 to preclude energization of the armatures of the respective copy feed motors 255 and 256. Thus, the copy feed motors 255 and 256 cannot be energized to rotate until the starting relay 464 for the motor controllers 311 and 312 is energized to a closed position.

It will be apparent that closure of the tracer control switch 411 operates to energize the time delay relay 414, which subsequently moves to a closed position and, more particularly, the main tracer control relay 415 to effect an immediate and partial energization of the tracer control system 306. As hereinbefore described, the various components of the complete system that are immediately energized by the transmission of three phase power from the line conductors $L_1$, $L_2$ and $L_3$ include the armature of the synchronous shutter motor 293; the rectifier 307; the translator 309 and the light source 286. As a necessary concomitant therewith, rectified direct current is likewise supplied from the rectifier to the field windings of the synchronous shutter motor 293, the amplifier 308, and the field windings of the copy feed mottors 311 and 312. During this initial starting interval therefore, the flow of current from the main supply conductors $L_1$, $L_2$ and $L_3$ through the closed contact bars of the tracer control relay 415 operates to dynamically energize the various components hereinbefore enumerated within the tracer control system 306. For example, the synchronous shutter motor 293 is brought from zero speed to its correct operating speed for rotating the shutter head 287 to pass the regularly recurring light pulses through the D-shaped copy aperature 295 in properly timed relationship. Likewise, the various tubes and control elements within the rectifier 307, amplifier 308 and translator 309 are rendered dynamically operable to their proper operating temperatures in a manner to subsequently pass copy feed motor control signals from the translator to the motor controllers 311 and 312.

As soon as the various components of the control system are at proper operating temperature, the time delay relay 414 which has already been energized, is adapted to be moved to a circuit completing position. Movement of the time delay relay 414 to closed position, in turn, operates to energize the signal interrupting relay 449 to a closed circuit completing position. As the time delay relay 414 is moved to closed position, a holding control circuit is completed from the energized conductor 348 through the closed contact bar 426 thereof to a conductor 465 connected to one terminal of a coil 467 associated with the signal interrupting relay 449. Current flowing through the coil 467 energizes it to effect movement of the contact bars of the relay 449 to a closed position, the holding circuit being completed from the opposite terminal of the coil to a conductor 469. From the conductor 469, the circuit continues through a conductor 470, the normally closed contact bars of the saddle limit switch 471 and table limit switches 472, 473 respectively to a conductor 475 and through the normally closed contact bar of the relay 319 to a conductor 476. The circuit continues through the normally closed contact bar of the relay 379 to a conductor 478 connected to the energized line 417.

Movement of the normally closed contact bar 448 of the relay 449 upwardly interrupts the transmission of output signal voltage from the amplifier 308 to the common conductor 451 connected to the cathodes of the tubes in the translator 309, thereby allowing the potential of the grids of the translator tubes to return to their normal amplifier output level. With the contact bar 448 moved to circuit interrupting position the signal output voltage from the amplifier 308 is transmitted directly from the conductors 446 to a conductor 477 that is connected through branch conductors to the respective terminals of four manually operable, normally closed switches 482, 483, 484 and 485. From the switches, the signal voltage continues through the respective contact bars 486, 487, 488 and 489 thereof to four branch conductors 491, 492, 493 and 494 that are, in turn, connected to the respective control grids of the four tubes in the translator 409. With this condition existing, the signal output voltage from the amplifier 308 operates to raise the potential of the translator tube grids to translator cathode level for one quarter period timed interval once during each cycle of rotation of the aperture 295 as it overlaps the edge of the pattern 302 to pass light, thereby selectively rendering certain of the tubes conductive depending on copy travel direction. At the same time, the plates of one or another of the translator tubes is more positive during that interval, due to the quadrature phase spaced voltage relationship between these tube anodes as fully explained in the aforementioned patent application, and those particular translator tubes are conductive. Consequently, a motor control signal is transmitted from the translator 309 through the conductors 496 and 497, to the east-west motor controller 311, and through the conductors 498, and 499 to the north-south motor controller 312.

Simultaneously with the movement of the contact bar 448 of the signal interrupting relay 449 to signal passing position, the contact bars 502 and 503 thereof are moved upwardly to closed circuit completing position. Upward movement of the contact bar 502 completes a control circuit from the cathodes of the tubes in the translator 309 through the common conductors 451 and 450, the contact bar 502, and a conductor 504 connected through four branch conductors 506, 507, 508 and 509 to the respective terminals of the four manually operable control switches 482, 483, 484 and 485.

A single pivotally movable toggle lever 511 is selectively operable to actuate any single one or any adjacent pair of the switches 482, 483, 484 and 485 to permit selective manual control of the four quadrature phase spaced tubes in the translator 309. Movement of the pivotal lever 511 to operate a selected switch operates to disconnect the grid of the associated translator tube from the automatic copy signal supply conductor 446 and, in turn, operates to connect that particular grid to the common conductor 504 through the closed contact bar 502, the conductor 450 to the common conductor 451 connected to the cathodes of the four tubes in the translator 309. The particular translating tube controlled by that particular control grid is then operative to effect feeding movement of the work table in the selected direction of travel. The toggle lever 511 is selectively operable to effect feeding movement of the work table 23 in one of eight major directions of travel including north, northwest, west, south-west, south, south-east, east and northeast. The directions intermediate the four major points of the compass are obtained by actuating the toggle lever 511 to actuate any two adjacent switches simultaneously for energizing both of the copy feed motors 255 and 256 to effect resultant feeding movement of the table 23 along a selected angular path of travel.

Referring again to the time delay relay 414, the upward movement thereof after a predetermined timed interval effects closure of the contact bar 426 for energizing the signal interrupting relay 449 which, in turn, completes a circuit through opening the contact bar 448 thereof for rendering the translator 309 operative to supply motor output control signals through the conductors 496, 497 and the conductors 498 and 499. The motor control signals from the translator 309 may be in response to input copy signals from the photocell 296, or, alternatively in response to closure of one or another of the switches 482, 483, 484 and 485 by the manual control lever 511. However, even at this time the copy feed motors 255 and 256 are not energizable in response to motor control signals from the translator 309 until a relay 464 is moved to closed position for supplying current from the main supply lines L₁, L₂ and L₃ to the motor controllers 311 and 312. In starting the copy control system, energization of the motor controllers 311 and 312 is delayed slightly until the translator 309 is operative to pass properly timed motor control signals thus precluding the premature energization of one of the copy feed motors.

To accomplish this slight delay, movement of the signal interrupting relay 449 to upward position effects closure of another contact bar 503 to complete a control circuit from the energized control line 420, through the contact bar 503 to a conductor 512 leading to a coil 513 of an intermediate relay 514. The flow of control current through the coil 513 effects energization of the relay 514 to a closed position and continues to the conductor 398, leading to the energized return conductor 348. Energization of the coil 513 thus effects movement of a contact bar 515 of the relay 514 to closed position to complete a control circuit to a coil 517 associated with the motor control relay 464; the holding circuit being completed from the energized conductor 398, the contact bar 515 of the relay 514, to a conductor 518 connected to one terminal of the coil 517. The opposite terminal of the coil is connected to a conductor 516 connected to the energized conductor 419. Energization of the coil 517 effects movement of the motor control relay 464 to a closed position for completing a power circuit from the energized conductors 436, 437 and 438 through the three closed contact bars of the relay 464 to the conductors 519, 520 and 521 connected to supply current to the motor controller 311 and the motor controller 312.

As soon as the motor controllers 311 and 312 are energized by the power supply conductors 519, 520 and 521; any motor control signal supplied by the translator 309 through the input copy signal conductors 496, 497, 498 and 499 will so activate the motor controllers 311 and 312 as to effect a selectively corresponding energization of the reversible copy feed motors 255 and 256. Continued energization of the copy feed motors 255 and 256 to effect coordinate movement of the saddle 22 and table 23 may then be effected either by recurrent light pulses passed as the rotating copy aperture 295 in the shutter 294 overlaps the edge of a pattern delineating a guiding line of trace; or alternatively by selective manual manipulation of the toggle lever 511. In either the manual or the automatic copy control of the copy system, the translator 309 is operative to supply motor control signals through the conductors 496, 497 and the conductors 498, 499 for selectively activating the motor controllers 311 and 312.

In response to the signal voltage from the translator 309, the motor controllers 311 and 312, in turn, are operative to rectify input power supplied thereto by the conductors 519, 520 and 521 and transmit rectified direct current of the proper polarity and voltage through conductors 523, 524 and conductors 525, 526 respectively for selectively energizing the copy feed motors 255 and 256. The rectified output current for energizing the copy feed motors 255 and 256 supplied by the respective motor controllers 311 and 312 is in direct accordance with the dictates of the input motor control signals transmitted thereto through the conductors 496, 497 and 498, 499 from the translator 309. Thus, during an automatic copying operation, the motors 255 and 256 are selectively operable to drive the saddle 22 and work table 23 for moving the pattern support 280 along a resultant path of travel corresponding to the configuration of a guiding pattern, and in order to maintain the edge thereof in continuously overlapping relationship with the rotating copy aperture 295.

Likewise, at the start or completion of an automatic copying operation, the pivotably movable toggle lever 511 is selectively operable to so energize the copy feed motors 255 and 256 as to move the pattern support 284 for moving the pattern 302 supported thereby either into or out of the proper overlapping relationship with the copy aperture 295 to, in turn, move the workpiece out of engagement with the cutter carried by the tool spindle 18.

In the event that either the saddle 22 or table 23 is moved beyond predetermined limits under the power supplied by the copy feed motors 255 and 256, one or another of the table limit switches 472, 473 or the saddle limit switch 471 is actuated to open position to immediately brake or plug the movement of the saddle 22 and table 23. Immediately upon movement of one or another of the limit switches to open position the saddle limit switch 471, for example, the holding circuit through the conductor 469 to the coil 467 of the signal interrupting relay 449 is interrupted allowing the relay to drop downwardly to its normally deenergized position. Immediately thereupon, the contact bar 443 of the relay drops to its normally closed position to connect the signal output conductor 445 from the amplifier 308 directly to the cathodes of the four tubes of the translator 309 to render the tubes conductive. This condition of the translator 309 effects an immediate braking of the copy feed motors 255 and 256 to a standstill to stop all movement of both the saddle 22 and table 23. By plugging or braking the copy feed motors 255 and 256 to a stop before they are deenergized, all movement of the saddle 22 and table 23 is stopped immediately to prevent any coasting or continued movement in the direction of overtravel. The electrical braking of the copy motors 255 and 256 thus prevents any damage to the machine that might occur if the motors were immediately deenergized and the saddle 22 and table 23 allowed to simply coast to a stop.

To obtain the desired braking effect, the copy feed motors 255 and 256 remain energized slightly after the occurrence of output braking signals from the translator 309 which are produced immediately upon tripping one of the limit switches 471, 472, or 473 to open position. Deenergization of the signal interrupting relay 449 subsequently, after an extremely slight delay effects a deenergization of the copy feed motors 255 and 256 in addition to causing the translator to brake the copy feed motors to a stop. As the relay 449 drops downwardly, the contact bar 503 thereof is moved to open position to interrupt the control circuit from the energized conductor 420, through the contact bar and the conductor 512 to the solenoid coil 513 of the intermediate relay 514. Deenergization of the intermediate relay 514, in turn, interrupts the control circuit to the solenoid coil 517 of the motor control relay 464 permitting the contact bars thereof to drop to open position to interrupt the flow of three phase power supply current to the motor controllers 311 and 312. The brief interval occurring between the deenergization of the signal interrupting relay 449 and the motor control relay 464 is of sufficient duration to permit the copy feed motors 255 and 256 to be braked to a complete stop before they are deenergized.

Thus, after one or another of the limit switches 471, 472, or 473 is tripped to open position, rotation of both the copy feed motors 255 and 256 is stopped to prevent further movement of the saddle 22 or table 23 in the direction of overtravel. To facilitate restoration of the copy control system to normal position, the main tracer control relay 414 and the time delay relay 415 remain energized during this period to supply input power to the light source 286, shutter motor 293, photocell 296, rectifier 307, amplifier 308 and translator 309. Thus, as soon as the overtravel condition is corrected to effect movement of the limit switches 471, 472, and 473 to their normally closed position, the balance of the copy control system is again re-energized so that normal copying operation may be resumed. It will be apparent that energization of one or another of the relays 319 and 379 to an open position will function in a similar manner to stop rotation of the copy feed motors, in the event the directional levers 204 and 199 are accidentally unlatched during a copying operation.

To correct the overtravel condition, caused by opening a limit switch there is provided a switch 527 that is manually movable from its resiliently biased position, shown in Fig. 15, to momentarily deenergize the light source 286 and simultaneously therewith, re-activate the deenergized portion of the copy control system 306 to permit movement of the saddle 22 and table 23 in a direction opposite to the direction of overtravel thereby re-closing one of the open limit switches. The switch 527 is normally resiliently biased into a position in which the contact bar 528 thereof bridges a pair of contacts to complete a circuit from the conductor 438, the normally closed contact bar, to a conductor 529 connected to energize the light source 286, the circuit thereto being completed through the energized conductor 437. Initial movement of the switch 527 thus interrupts the flow of current from the conductor 438 to the conductor 529 for deenergizing the light source 286. Further movement of the switch 527 moves the contact bar 528 into a position bridging a pair of associated contacts to complete a shunt control circuit for momentarily re-energizing the signal interrupting relay 449, the intermediate relay 514, and the motor control relay 464. The shunt control circuit is completed from the energized conductor 475, a shunt conductor 531, the closed contact bar 528 of the switch 527, connected to the conductor 469 extending to one terminal of the solenoid coil 467 of the signal interrupting relay 449. After the relay 449 has been energized in response to the manual switch 527, the toggle lever 511 is moved in a direction opposite the direction of overtravel to correct the overload condition by moving the saddle 22 and table 23 back within their allowable range of movement. As soon as the overtravel condition is corrected, one or another of the limit switches 471, 472, and 473 is returned to normally closed position and the copy control circuit will again be completed from the conductor 475, through the closed contact bars of the interconnected limit switches to the conductors 470 and 469. The switch 527 is then released to its resiliently biased position to energize the light source 286 and the copying operation can be resumed in the usual manner.

Mechanism for actuating the limit switches to open circuit interrupting position, as well as for permitting the switches to return to their normally closed position, is associated with the saddle 22 and table 23. As shown in Fig. 2, the saddle limit switch 471 is secured to the knee 21 in such a position that the actuating plunger thereof is tripped to an open position whenever it is engaged by a stop bracket secured to the saddle 22. In a similar manner, the limit switches 472 and 473 are secured to the saddle 22 in a manner that the respective actuating plungers thereof are actuated to an open circuit interrupting position whenever stop brackets secured toward the opposite ends of the table 23 are moved into engagement with one or another of the switches.

Figure 16:
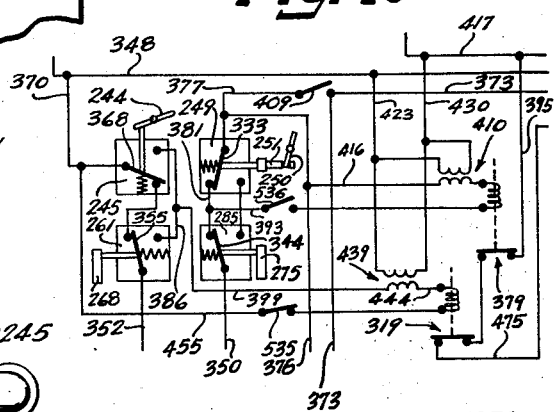

In a modified form of the control circuit, as shown in Fig. 16, there is provided an arrangement for moving one of the work supporting members in response to the copy system and the other by means of the main drive motor 26. The fragmentary circuit shown in Fig. 16 is generally similar to a corresponding portion of Fig. 15 and is intended to be operated in conjunction with the control circuit there shown. In Fig. 16, however, there are included two switches 535 and 536 that are respectively operable to preclude energization of the copy interlock relays 319 and 379 respectively, thereby circumventing the electrical interlock for certain selected modes of operation. With the switches 535 and 536 both in closed position, the interlocking arrangement operates in a manner identical to that previously described in connection with Fig. 15. With one or another of the switches 535 and 536 in open position, however, the mechanical controlling mechanism can be so manipulated as to effect movement of the table 23 in response to the table copy feed motor 256 and, simultaneously therewith, movement of the saddle 22 in response to the main drive motor 26.

In a similar manner, as illustrated in Fig. 16, the control circuit can be so conditioned that the table 23 is driven by the main drive motor 26 and the saddle 22 is driven by the saddle copy feed motor 255. With the saddle directional lever 204, Fig. 7, latched in neutral position, and the saddle copy clutch 260, Fig. 3, engaged, the contact bars 368 and 355, Fig. 16, of the interlocking switches 245 and 261 are positioned as shown in Fig. 16. At the same time, the table directional lever 199, Fig. 10, is unlatched and the table copy clutch 274, Fig. 3, is disengaged to position the contact bars 333 and 344, Fig. 3, of the switches 249 and 285 as shown. A control circuit is then completed from the conductor 377 for energizing the conductors 350 and 352 that are connected to energize the coil 378, Fig. 15, of the main drive motor 26 which is then operable to drive the table 23. With the switch 536 moved to open position the interlocking relay 379 remains in its normally closed position. During this condition of operation therefore, the copy control system is connectable to energize the saddle copy feed motor 255 for driving the saddle 22 since the saddle copy clutch 260 is in engaged position.

From the foregoing explanation of the construction and operation of a preferred embodiment of the invention, it is apparent that there has been provided an improved dual transmission and control mechanism for a milling machine that is selectively operable to perform automatically controlled copying operations as well as manually controlled conventional milling operations. The dual controlling mechanism is so integrated as to facilitate changing from one selected mode of operation to another in accordance with the requirements of the work to be performed. The controlling mechanism is likewise arranged to combine certain functions of conventional machine operation with certain functions of copying machine operation to provide a completely integrated and coordinated controlling system.

Although only one principal embodiment of the invention has been shown and described, it will be apparent to one skilled in the art to which this invention relates, that various modifications in the manner of constructing the machine may be made without departing from the spirit and scope of the invention as defined in the subjoined claims.

The principles of this invention having now been fully explained in connection with the foregoing description, we hereby claim as our invention:

1. In a machine tool; a rotatable member; a plurality of power operable means selectively and independently connectable to rotate said member; said power operable means comprising a manually rotatable handwheel, a manually engageable feed transmission, and a reversibly energizable motor; a handwheel clutch selectively engageable to transmit power from said handwheel to said rotatable member; a transmission clutch selectively engageable to transmit power from said feed transmission to said rotatable member; a selectively engageable automatic control circuit including a source of electrical energy and a normally open disconnect switch connectable to effect a selective energization of said motor; said switch being operable to preclude energization of said motor whenever it is in its normally open position; and a latching mechanism selectively operative to latch said handwheel clutch and said transmission clutch in disengaged power interrupting position; said latching mechanism being connected to actuate said switch to a closed position whenever said handwheel clutch and said transmission clutch are latched in disengaged position.

2. In a milling machine; a plurality of slidably superimposed work supporting members slidably carried for rectilinear movement in mutually perpendicular planes, said work supporting members comprising a vertically movable knee, a transversely adjustable saddle, and a longitudinally movable work table; a plurality of power transmitting trains respectively connectable to effect selective individual movement of said members; a plurality of reversibly engageable disconnect clutches respectively interconnected between said power transmitting trains and said members; said clutches comprising a knee driving clutch, a saddle driving clutch, and a table driving clutch; a copy control system connectable to drive said table and said saddle independently of said power trains; said copy control system comprising a pair of copy feed motors respectively connected to drive said saddle and said table; a selectively energizable copy control circuit including a pair of disconnect switches connectable to effect selectively proportionate energization of said motors for effecting a coordinated movement of said saddle and said table; a pair of latching devices respectively connected to latch said saddle clutch and said table clutch in disengaged power interrupting position; said latching devices being respectively connected to actuate said disconnect switches to a closed circuit completing position to render said copy control circuit operative to energize said copy feed motors whenever said saddle clutch and said table clutch are latched in disengaged position whereby said table and said saddle are coordinately movable in response to said copy control circuit and whereby said saddle and said table are vertically adjustable when so operating by selectively engaging said knee clutch for connecting said power transmitting train to effect vertical movement of said knee.

3. In a milling machine, a frame, a saddle slidably carried by said frame for rectilinear movement, a work table slidably carried by said saddle for rectilinear movement in a plane transverse to the plane in which said saddle is movable, a variable speed transmission mechanism operatively connected to drive said saddle and said table at a selected feeding rate, separate reversing clutches respectively connected to transmit power from said variable speed mechanism to said saddle and said table, said reversing clutches being movable to a neutral disengaged position to interrupt the transmission of power from said variable speed mechanism to said saddle and said table, a pair of pivotable directional levers being carried for movement in either direction from a central neutral position and being respectively connected to actuate said clutches, means for locking said directional levers in a neutral disengaged position, separate motors respectively connectable to effect a simultaneous coordinated feeding movement of said saddle and said table independently of said transmission mechanism, an automatic electronic control circuit including circuit interrupting means operatively connected to effect a predetermined coordinate energization of said motors, said circuit interrupting means being operatively connected to be actuated to a closed position to render said automatic control circuit operative to coordinately energize both of said motors whenever said locking means are actuated to lock said directional levers in a neutral disengaged position.

4. In a machine tool, a saddle, a table slidably carried by said saddle for rectilinear movement, a feed screw journalled at its opposite ends in said table, a cooperating feed nut secured to said saddle in a manner to be threadedly engaged by said feed screw, means for moving said table along said saddle including a rotatable drive sleeve slidably splined to said feed screw and journalled in said saddle in fixedly spaced relationship to said feed nut, a manually engageable variable feed transmission mechanism including a main drive motor selectively engageable to rotate said drive sleeve for moving said table, a selectively engageable transmission clutch operatively engageable to transmit power from said feed transmission for rotating said drive sleeve, a manually rotatable handwheel operatively connectable to rotate said drive sleeve independently of said feed transmission, a selectively engageable handwheel clutch operatively connectable to transmit power from said handwheel to rotate said drive sleeve, interlocking means interconnected between said clutches in a manner to preclude the engagement of one of said clutches whenever the other of said clutches is engaged to rotate said drive sleeve, a reversibly energizable variable speed motor directly connectable to rotate said feed screw, a selectively engageable control circuit including a source of energy and a normally open circuit interrupting switch connectable to energize said motor for rotation at a predetermined rate and direction of rotation, said switch being operable to preclude energization of said motor whenever it is in its normally open position, and a latching device connected to latch both of said clutches in disengaged position, said latching device being connected to actuate said disconnect switch to a closed circuit completing position whenever said handwheel clutch and said transmission clutch are latched in disengaged power interrupting position.

5. In a machine tool having a longitudinally movable work support, a non-rotatable antifriction nut member being adapted to constrain a plurality of bearing balls for recirculating movement and being carried by said machine, a rotatable screw journalled in said work support presenting a helical ball receiving groove disposed to be engaged by said bearing balls constrained for recirculating movement in said antifriction nut member, said screw being provided in its outer periphery with a plurality of extremely shallow driving splines intersecting the crest of the helical ball receiving groove formed therein, a selectively rotatable hollow driving sleeve carried by said machine in spaced relationship to said nut and having formed on its inner circumference a plurality of complementary splines adapted to slidably engage the shallow splines formed on said screw, power operable means connectable to selectively rotate said drive sleeve for rotating said screw to effect movement of said work support, a manually disengageable clutch mechanism operatively interconnecting the said power operable means and said drive sleeve for selectively controlling the movement of said work support, a reversible feed motor connectable to selectively rotate said feed screw independently of said power operable means and said drive sleeve, automatic control means operatively connected to effect selective energization of said reversible feed motor, circuit means including a powr source and a normally open interlocking switch operatively interconnected in said control means to preclude energization of said reversible feed motor whenever said switch is in its open position, and a latching mechanism operatively actuatable to lock said clutch mechanism in disengaged position and simultaneously therewith to actuate said switch to a closed position.

6. In a machine tool, a movable member, a handwheel connectable to drive said member, a feed transmission including a main driving power source connectable to drive said member independently of said handwheel, a handwheel clutch operatively connected to transmit power from said handwheel to said member, a transmission clutch operatively connectable to transmit power from said feed transmission to said rotatable member, interlocking means interconnected between said clutches operative to preclude simultaneous engagement of said clutches, a separate motor operatively energizable to drive said member independently of said handwheel and said feed transmission, a selectively energizable control circuit including a source of electrical energy and a normally open disconnecting switch operatively connectable to energize said motor, and a latching device connected to latch said handwheel clutch and said transmission clutch in disengaged power interrupting position, said latching device being connected to actuate said disconnect switch to a closed position whenever said clutches are latched in disengaged position.

7. In a milling machine, a frame, a work table slidably carried by said frame for rectilinear movement, a rotatable table feed screw journalled at its opposite ends in said table, said screw being provided in its outer periphery with longitudinally extending driving splines, a stationary feed nut secured to said frame in position to threadedly engage said feed screw, an internally splined driving sleeve journalled in axially fixed spaced relationship to said feed nut in a manner to slidably engage said feed screw, a power transmitting train connectable to rotate said driving sleeve for driving said feed screw to effect longitudinal movement of said table, a handwheel connectable to rotate said driving sleeve for moving said table independently of said power transmitting train, a pair of disconnect clutches respectively engageable to transmit driving power from said power train and said handwheel to respectively rotate said driving sleeve, interlocking means operatively disposed to prevent engagement of one of said clutches whenever the other of said clutches is engaged, a separate reversibly energizable motor carried by said table and being operatively connectable to rotate said feed screw independently of said power train and said handwheel, a selectively energizable control circuit including a source of power and a normally open switch adapted to be closed whenever said motor is to be energized for rotating said drive sleeve independently of said power train and said handwheel, and a latching device connected to latch both of said clutches in disconnected position, said latching device being operatively arranged to actuate said switch to closed position whenever said clutches are latched in disconnected position.

8. In a machine tool; a slidable work support; a plurality of power operable means selectively and independently connectable to move said work support; said power operable means comprising a manually rotatable handwheel, a manually engageable feed transmission, and a selectively connectable reversibly energizable motor; a handwheel clutch selectively engageable to transmit power between said handwheel and said work support; a transmission clutch selectively engageable to transmit power between said feed transmission and said work support; an interlocking mechanism operatively interconnected between said handwheel clutch and said transmission clutch in a manner to preclude simultaneous engagement of said clutches; said interlocking mechanism connected to be actuated on movement of one or the other of said clutches into engaged position; a selectively energizable control circuit including a source of electrical energy and normally open interlocking switching means selectively operative to energize said motor; said switching means being normally open to preclude energization of said motor whenever one or another of said clutches is engageable to move said work support; and a latching device connected to latch said handwheel clutch and said transmission clutch in a neutral power interrupting position; said interlocking device being operatively connected to actuate said interlocking switching means to a closed position whenever said handwheel clutch and said transmission clutch are latched in a power interrupting position.

9. In a machine tool, a rotatable member, a manually rotatable handwheel selectively connectable to rotate said member, a manually engageable feed transmission selectively connectable to rotate said member independently of said handwheel, a reversibly energizable motor selectively operative to rotate said member independently of said handwheel and said feed transmission, a selectively engageable handwheel clutch operatively connected to transmit power from said handwheel to rotate said member, a selectively engageable transmission clutch operatively connected to transmit power from said feed transmission to rotate said member, interlocking means operatively interconnected between said handwheel clutch and transmission clutch in a manner to preclude engagement of one of said clutches whenever the other of said clutches is engaged, a selectively energizable control circuit including interlocking switching means connectable to energize said reversible motor, and a latching device connected to latch said handwheel clutch and said transmission clutch in disengaged power interrupting position, said latching device being connected to actuate said interlocking switching means to a closed position whenever said handwheel clutch and said transmission clutch are latched in disengaged power interrupting position.

10. In a machine tool, a rotatable shaft having radially extending clutch teeth spaced inwardly from the outer end thereof, a handwheel rotatably journalled toward the outer end of said shaft presenting inwardly extending clutch teeth complementary to the clutch teeth formed on said shaft, said handwheel being carried for limited axial movement in a manner that the clutch teeth formed thereon are selectively movable into or out of engagement with the clutch teeth on said shaft, power operable means connectable to drive said shaft independently of said handwheel, a selectively engageable clutch operatively interconnected to transmit power between said power operable means and said shaft, a pivotal lever presenting a clutch tooth complementary to the clutch teeth on said handwheel, said lever being movable from a neutral position to an engaged position and being connected to effect engagement of said clutch to move said shaft under power, said lever when in engaged position being positioned so as to be interposed between the clutch teeth on said shaft and said handwheel and operable to retain said handwheel in its outermost position to preclude axial movement of said handwheel into clutching engagement with said shaft, said lever being operative when in engaged position to mesh the said clutch tooth formed thereon into clutching engagement with the said clutch teeth formed on said handwheel to preclude frictional rotational movement of said handwheel whenever said shaft is driven under power, auxiliary driving means comprising a separate motor connectable to drive said shaft independently of said handwheel and said power operable means, a selectively energizable control circuit including a source of electrical energy and a normally open switch means connectable to effect selective energization of said motor, a latch movably carried by said lever for selectively latching said handwheel in non-rotating disengaged position whenever said lever is in neutral position, and a locking element actuatable to simultaneously lock said lever in a neutral position and to lock said latch in latched position with said handwheel, said locking element being simultaneously operative when actuated to lock said lever in neutral position to actuate said switch to a closed position.

11. In a dual drive and control transmission for a pair of slidably superimposed work supports movably carried for selective rectilinear movement in mutually perpendicular planes, a common main drive motor, a selectively adjustable feed rate changer operatively connected to transmit power from said main drive motor for driving said work supports at a selected feeding rate, a pair of reversible directional clutches selectively engageable from a neutral disengaged position for transmitting power from said feed rate changer to respectively drive said work supports in a selected direction of movement, a pair of pivotable levers movable in either direction from a central neutral position and respectively connected to effect engagement of said clutches, a pair of latching mechanisms respectively connected to lock said levers in a neutral disengaged position, a pair of interlocking devices respectively connected to be actuated by said latching mechanisms, a pair of separate reversibly energizable variable speed motors respectively connectable to drive said work supports, a pair of disconnect clutches respectively engageable to transmit power from said motors for respectively driving said work supports, a second pair of interlocking devices operatively connected to be coordinately actuated by shifting movement of said disconnect clutches, all of said interlocking devices being operatively interconnected in a manner to preclude a simultaneous engagement and operation of both said common driving motor and said reversible variable speed motors for driving said work supports.

12. In a machine tool, a work support slidably carried for selective rectilinear movement, a rotatable screw shaft connected to move said member, a manually rotatable handwheel journalled on said shaft, selectively engageable clutching means operative to couple said handwheel to said shaft for effecting manual movement of said work support, a power driven rate changer selectively connectable to drive shaft for moving said work support independently of said handwheel, a reversible clutch selectively engageable from a central neutral position for transmitting power from said rate changer to drive said shaft for moving said work support in a selected direction of movement, interlocking means operatively interconnected between said clutching means and said reversible clutch to preclude simultaneous engagement of said clutches, a latching mechanism operatively connected to latch said clutching means and said reversible clutch in a disengaged position, said latching means being connected to lock said handwheel against rotation, automatically controlled auxiliary driving means including a reversibly energizable motor connectable to rotate said shaft for moving said work support independently of said handwheel and said transmission, and interlocking means connected to be actuated by said latchig mechanism and being operative to preclude movement of said shaft in response to said auxiliary driving means excepting when said clutching means and said reversing clutch are locked in disengaged position.

13. In a milling machine; a slidable work support; a rotatable drive shaft connected to move said work support; a handwheel journalled on said shaft and a separate power driven feed transmission selectively connectable to rotate said shaft for moving said work support; a separate auxiliary drive motor directly connectable to move said work support independently of said handwheel and said feed transmission; a handwheel clutch selectively engageable to transmit power from said handwheel to rotate said shaft; a transmission clutch selectively engageable to transmit power from said transmission to rotate said shaft; an interlocking mechanism operatively interconnected in a manner to preclude simultaneous engagement of said clutches; said interlocking mechanism connected to be actuated upon movement of one or another of said clutches to engaged position; a latching device connected to latch both of said clutches in disengaged position; and an electrical interlock including a selectively energizable control circuit connected to be operated by said latching device; said interlock being operative to preclude operation of said auxiliary drive motor whenever said latching device is in unlatched position and said work support is movable in response to said handwheel or said feed transmission.

References Cited in the file of this patent
UNITED STATES PATENTS

| | | |
|---|---|---|
| 1,871,224 | Shaw et al. | Aug. 9, 1932 |
| 2,120,196 | Wright | June 7, 1938 |
| 2,239,625 | Roehm et al. | Apr. 22, 1941 |
| 2,242,445 | Armitage | May 20, 1941 |
| 2,658,425 | Eserkaln et al. | Nov. 10, 1953 |